(12) United States Patent
Rackiewicz et al.

(10) Patent No.: US 8,151,492 B2
(45) Date of Patent: Apr. 10, 2012

(54) SCENT CARRYING HUNTING BOOT

(76) Inventors: Kyle Daniel Rackiewicz, Red Wing, MN (US); Kenton Donald Geer, Red Wing, MN (US); John Lee Rademacher, Red Wing, MN (US)

( * ) Notice: Subject to any disclaimer, the term of this patent is extended or adjusted under 35 U.S.C. 154(b) by 1055 days.

(21) Appl. No.: 11/975,696

(22) Filed: Oct. 19, 2007

(65) Prior Publication Data

US 2008/0163515 A1    Jul. 10, 2008

Related U.S. Application Data

(60) Provisional application No. 60/852,843, filed on Oct. 19, 2006.

(51) Int. Cl.
*A43B 23/00* (2006.01)
*A43B 5/00* (2006.01)
(52) U.S. Cl. .............. 36/136; 36/113; 36/132
(58) Field of Classification Search ............ 36/113, 36/132, 136
See application file for complete search history.

(56) References Cited

U.S. PATENT DOCUMENTS

| | | | |
|---|---|---|---|
| 1,213,036 A | 1/1917 | Taylor, Jr. | |
| 2,712,700 A | 7/1955 | Solomon | |
| 2,959,354 A | 11/1960 | Beck | |
| 4,186,502 A | 2/1980 | Foster | |
| 4,302,899 A | 12/1981 | DeHart | |
| 4,374,571 A | 2/1983 | Hirvela | |
| D277,615 S | 2/1985 | Gamm | |
| 4,506,806 A | 3/1985 | Lincoln et al. | |
| 4,516,337 A * | 5/1985 | Adamik | 36/136 |
| 4,609,245 A | 9/1986 | Sakschek | |
| 4,682,715 A | 7/1987 | Reeves | |
| 4,722,477 A | 2/1988 | Floyd | |
| 4,735,010 A | 4/1988 | Grinarml | |
| 4,773,178 A * | 9/1988 | Marek | 43/2 |
| 5,024,008 A | 6/1991 | Maples | |
| 5,074,439 A | 12/1991 | Wilcox | |
| 5,148,949 A | 9/1992 | Luca | |
| 5,327,667 A | 7/1994 | Fore | |
| D351,934 S | 11/1994 | Devoe | |
| D356,664 S | 3/1995 | Cesaretti | |
| 5,461,814 A | 10/1995 | Reid et al. | |
| D378,010 S | 2/1997 | Isenberg | |
| D386,256 S | 11/1997 | Turpin | |
| D404,546 S | 1/1999 | Isenberg | |
| 5,906,298 A | 5/1999 | Ward | |
| 5,921,003 A | 7/1999 | Kim | |
| 5,924,221 A | 7/1999 | Schuver et al. | |
| 5,987,800 A | 11/1999 | Regan | |
| 6,038,804 A | 3/2000 | Cuerrier | |
| 6,115,948 A * | 9/2000 | Mitchell | 36/136 |
| 6,202,324 B1 | 3/2001 | Whitlock | |
| 6,289,612 B1 * | 9/2001 | Kent | 36/136 |
| 6,398,126 B1 | 6/2002 | Pitchford | |
| 6,457,266 B1 | 10/2002 | Hsiao | |
| 6,712,286 B2 | 3/2004 | Baxter et al. | |
| 6,715,220 B1 | 4/2004 | Isenberg | |
| 2002/0134001 A1 | 9/2002 | Burgeson | |
| 2003/0034403 A1 | 2/2003 | Baxter et al. | |
| 2006/0042127 A1 | 3/2006 | Shattuck | |
| 2006/0054715 A1 | 3/2006 | Thomas | |
| 2006/0169793 A1 | 8/2006 | Price et al. | |
| 2006/0289668 A1 | 12/2006 | Szymczak et al. | |

* cited by examiner

*Primary Examiner* — Jila Mohandesi
*Assistant Examiner* — Sharon M Prange
(74) *Attorney, Agent, or Firm* — Merchant & Gould P.C.

(57) ABSTRACT

Boots with an integrated scent carrying system are provided. The boots include a vented scented material holder that can leave a scent trail during hunting and/or to mask one's own scent during hunting. The boots are configured to effectively deliver the scent to the hunter's environment.

6 Claims, 28 Drawing Sheets

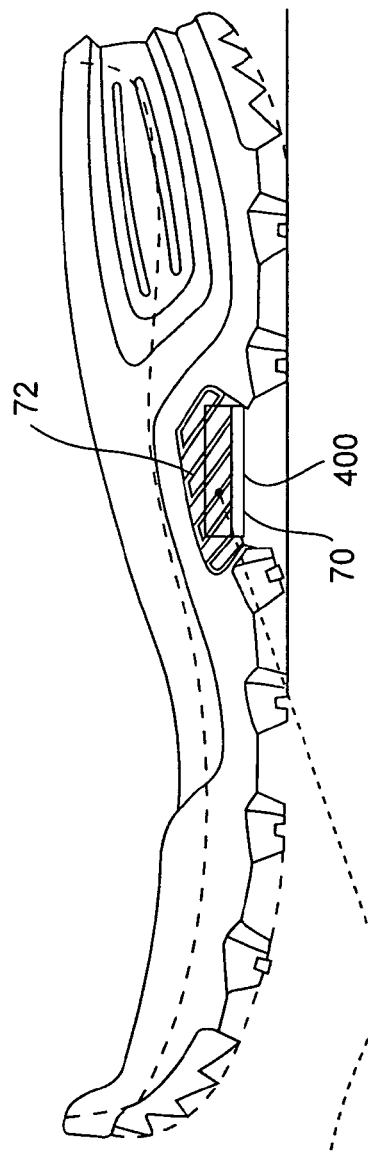
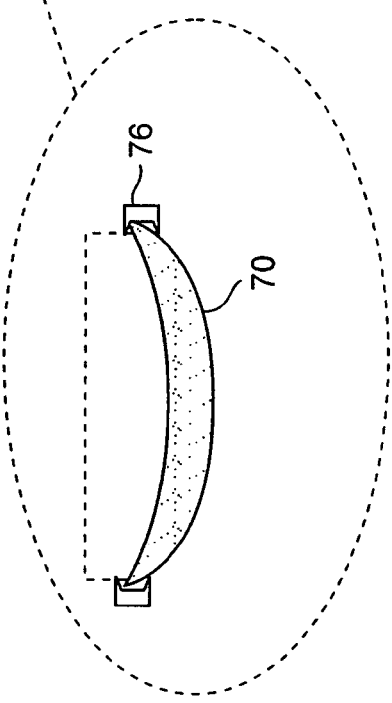
FIG. 15
FIG. 16

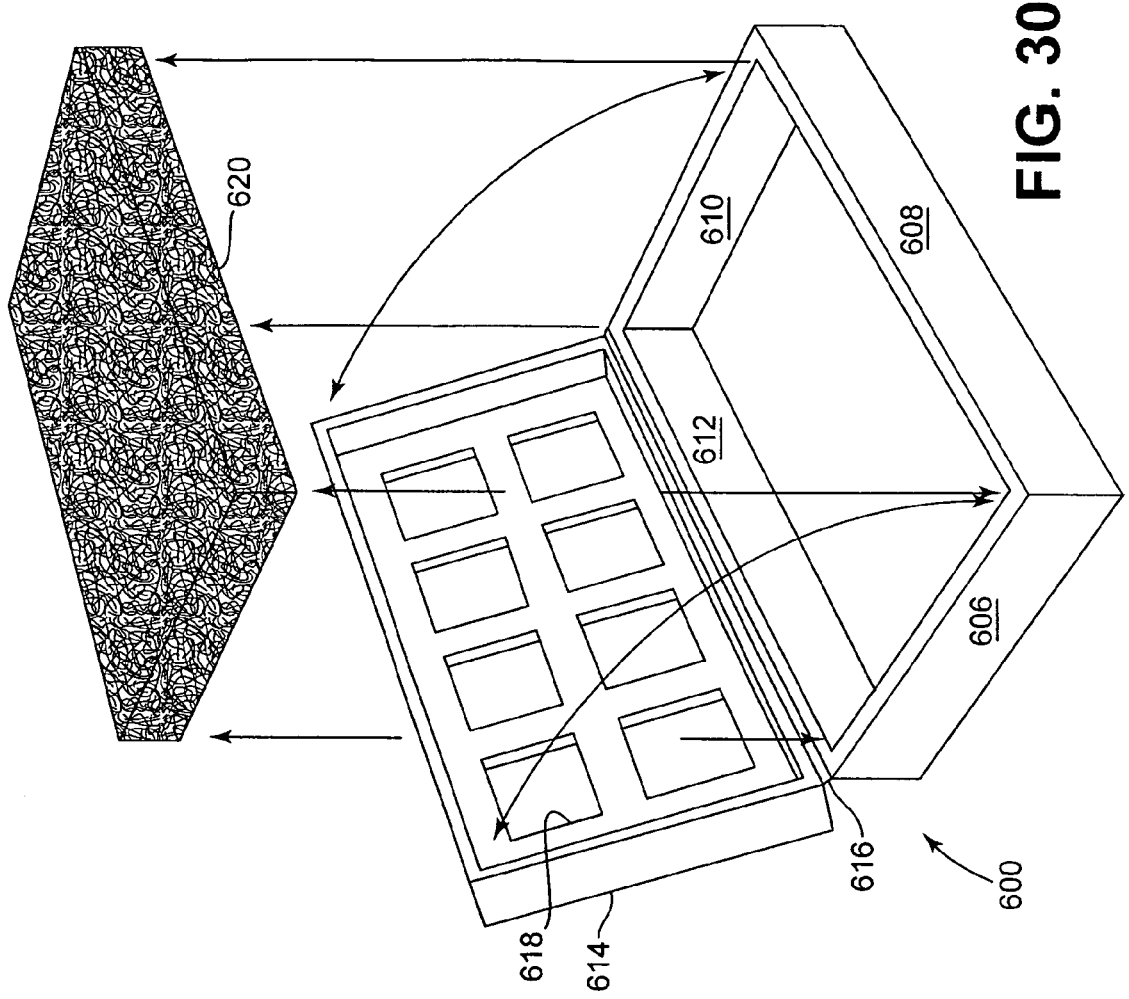
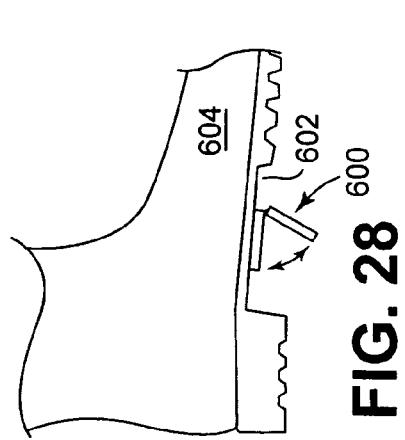
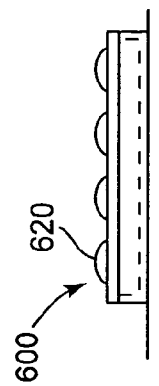

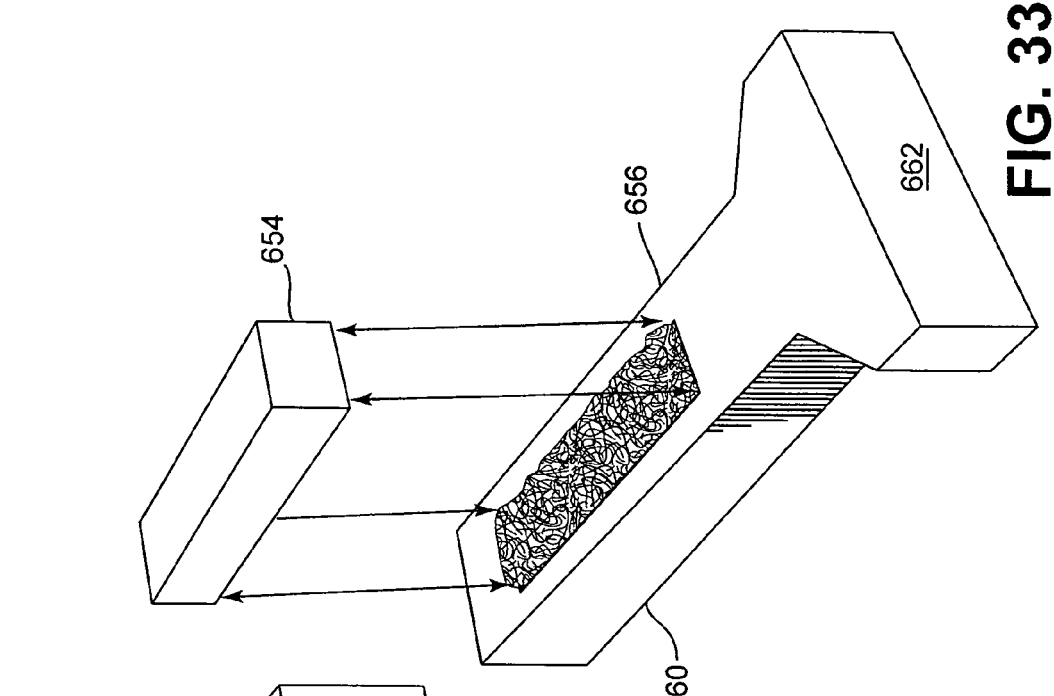
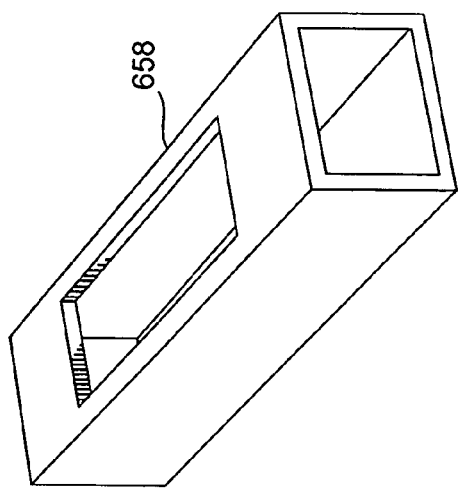
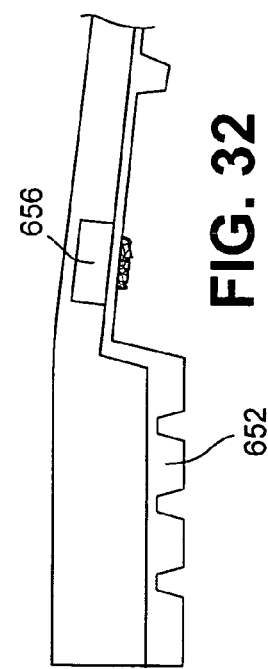

SCENT CARRYING HUNTING BOOT

CROSS REFERENCE TO RELATED APPLICATIONS

The present invention claims priority to Provisional Application Ser. No. 60/852,843, filed Oct. 19, 2006, and incorporated herein in its entirety.

TECHNICAL FIELD

The present invention relates to footwear and more specifically to a footwear that includes a scent carrier.

BACKGROUND

Hunters carry scented substances while hunting to mask their natural human scent and attract particular animals. Commercially available scent materials are available in liquid form and can be applied directly to the hunter's apparel. The liquid can also be applied to absorbent pads that can be strapped to or otherwise attached to the hunter. Commercially available scent materials can also be in the form of a solid wafer or other material that is pre-impregnated with scent or an attractant chemical.

Devices for attaching scented materials to hunters are known. For example, see U.S. Pat. No. 4,735,010 to Grinarmi titled Scent Dispenser For Attachment Under A Shoe, U.S. Pat. No. 5,074,439 to Wilcox titled Scent Or Lure Dispensing Device, U.S. Pat. No. 4,722,477 to Floyd titled Scented Hunting Strap, and U.S. Pat. No. 5,327,667 to Fore titled Device For Luring Deer. For luring purposes it can be desirable to attach the scent device so that the scent contacts the environment (e.g., the ground) and creates a scent trail as the hunter moves through the hunting environment. Preferably, the scent carrying device does not measurably add to the complexity of hunting and is not susceptible to falling off or otherwise failing in the field. In addition, since hunters sometimes wear the hunting apparel when they are not hunting and/or wear the same hunting apparel when hunting for different types of game, it is also desirable that the scent be easily removed from the hunting apparel.

Boots with integrated scent carrying means avoid some of the disadvantages associated with prior art scent carrying devices. Though such boots exist in the prior art, see for example U.S. Pat. No. 4,186,502 to Foster titled Scent Dispersing Boot, there is, nonetheless, a need for improved boots. There is a need in the art for an improved scent carrying devices and boots.

SUMMARY

A boot with an integrated scent carrying system is provided. The boot includes a vented scented material holder that can be conveniently loaded and unloaded. In some embodiments the holder includes a non-absorbent material to prevent the scent from permeating into the boot itself.

BRIEF DESCRIPTION OF THE DRAWINGS

FIG. 15 is a view of the boot of FIG. 14 with the upper portion of the boot removed;

FIG. 16 is a diagrammatic cross-sectional view of a portion of FIG. 15;

FIG. 28 is a schematic illustration of a tenth alternative embodiment of the present disclosure;

FIG. 29 is side view of a portion of the embodiment shown in FIG. 28;

FIG. 30 is an exploded view of a portion of the embodiment shown in FIG. 30;

FIG. 32 is a side view of a portion of the embodiment shown in FIG. 31;

FIG. 33 is an exploded view of a portion of the embodiment shown in FIG. 31;

DETAILED DESCRIPTION OF THE PREFERRED EMBODIMENT

Figure 1:
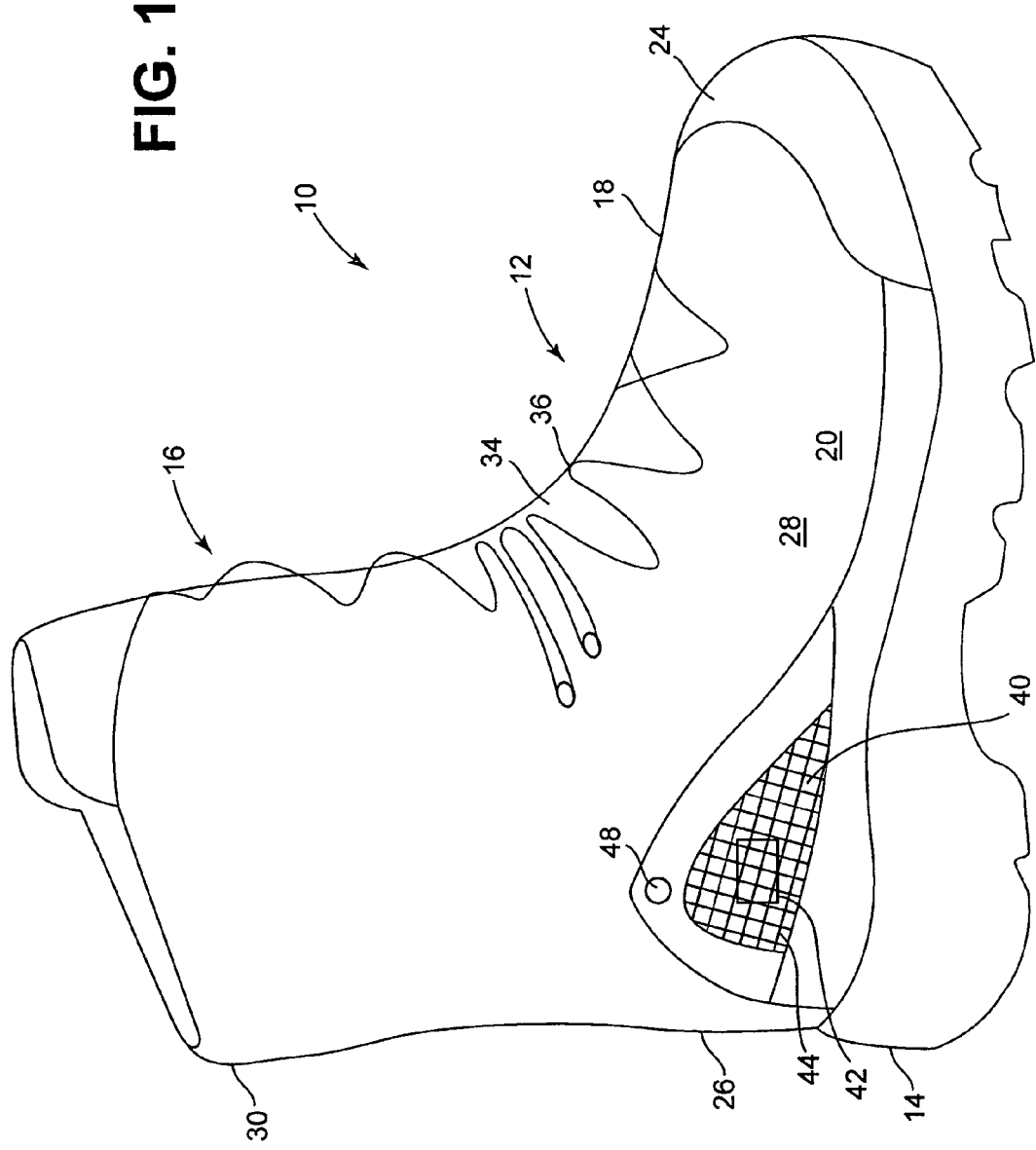
FIG. 1 is a right side view of a right footed boot according to a first embodiment of the present disclosure, illustrating the scent carrying compartment in a loaded closed state.
Figure 2:
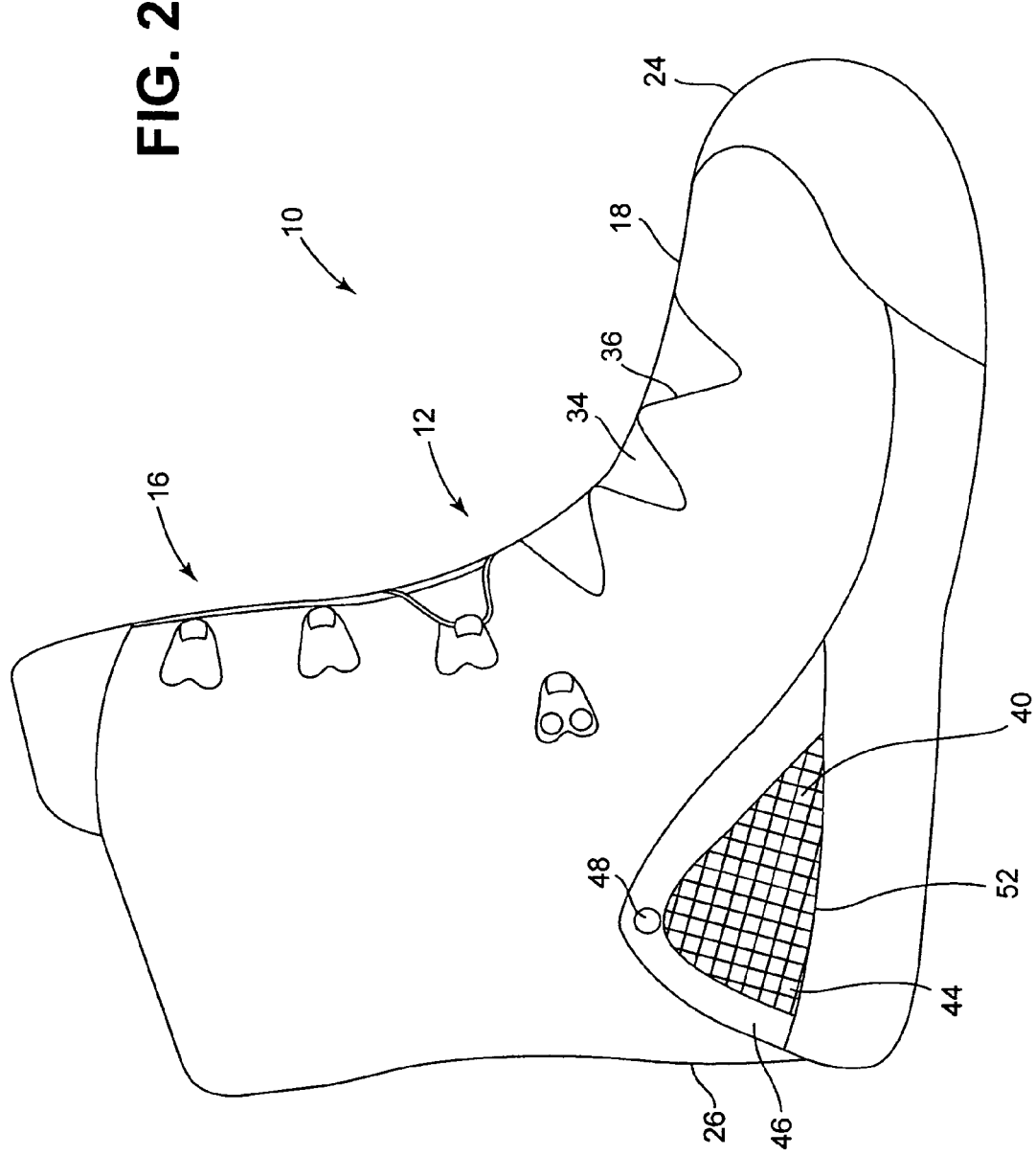
FIG. 2 is a right side view of the boot of FIG. 1 (with the sole removed) illustrating the scent carrying compartment in an unloaded closed state.
Figure 3:
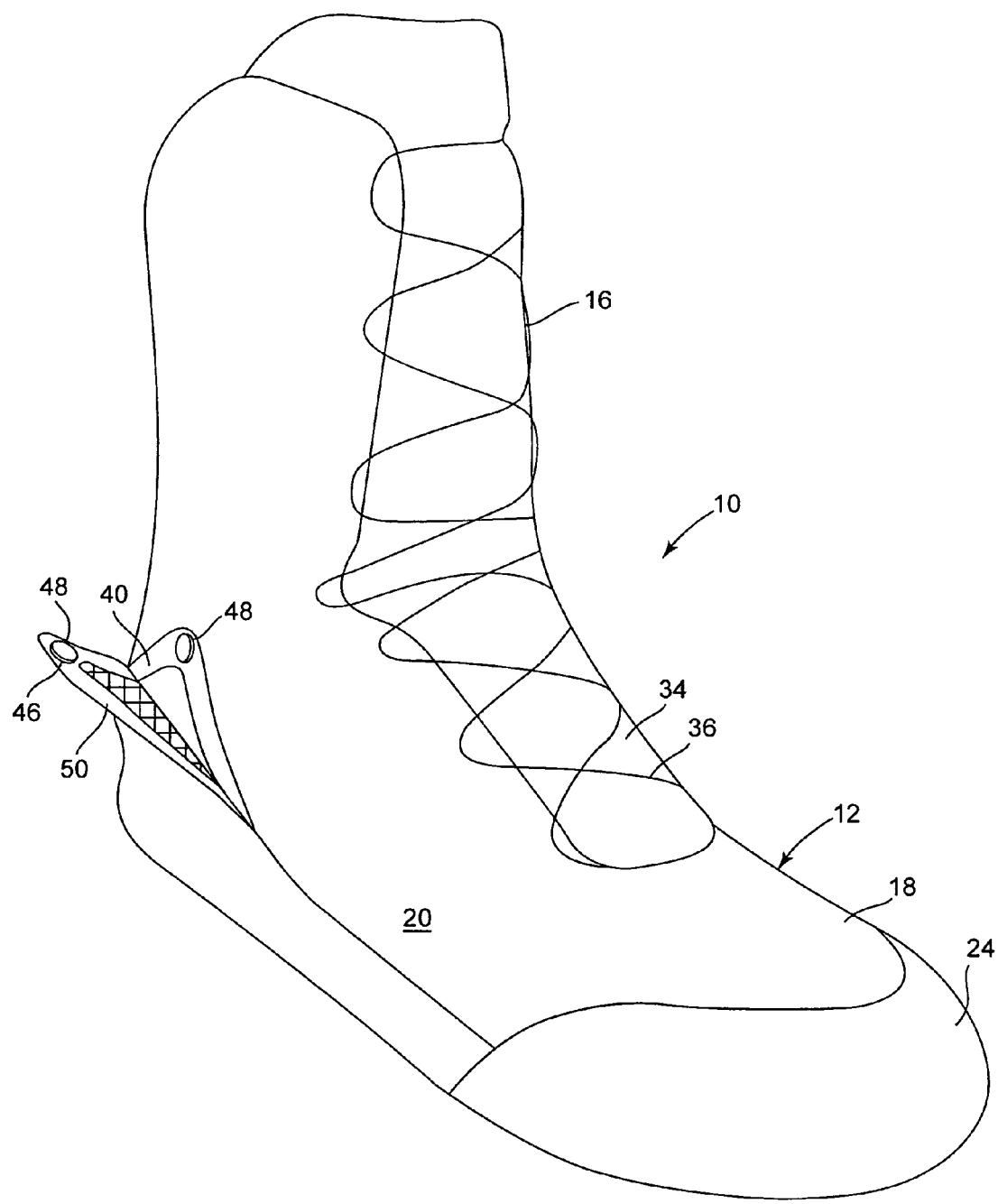
FIG. 3 is a perspective view of the boot of FIG. 2 illustrating the scent compartment in an open state.
Figure 4:
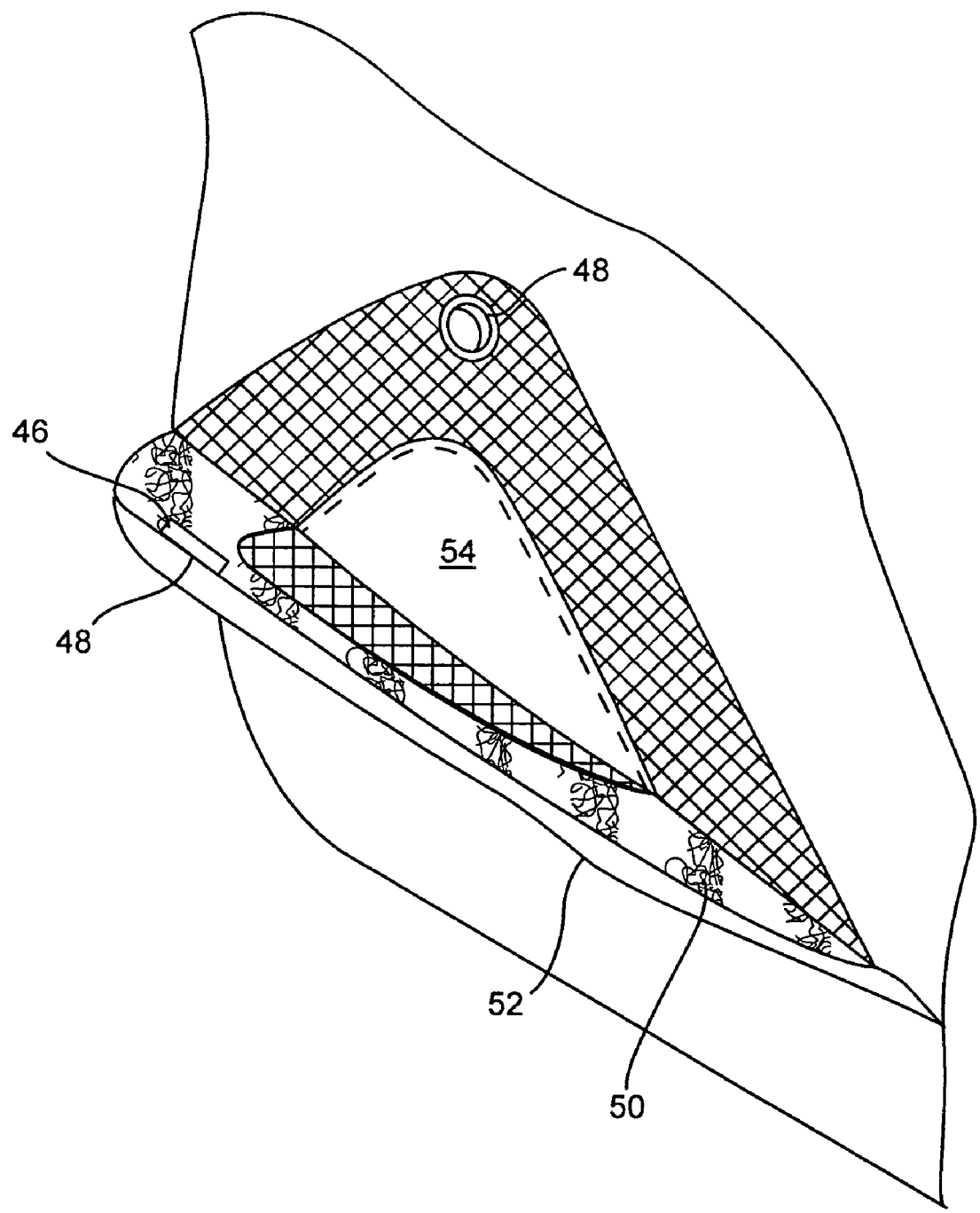
FIG. 4 is a perspective view of a portion of FIG. 3.
Figure 5:
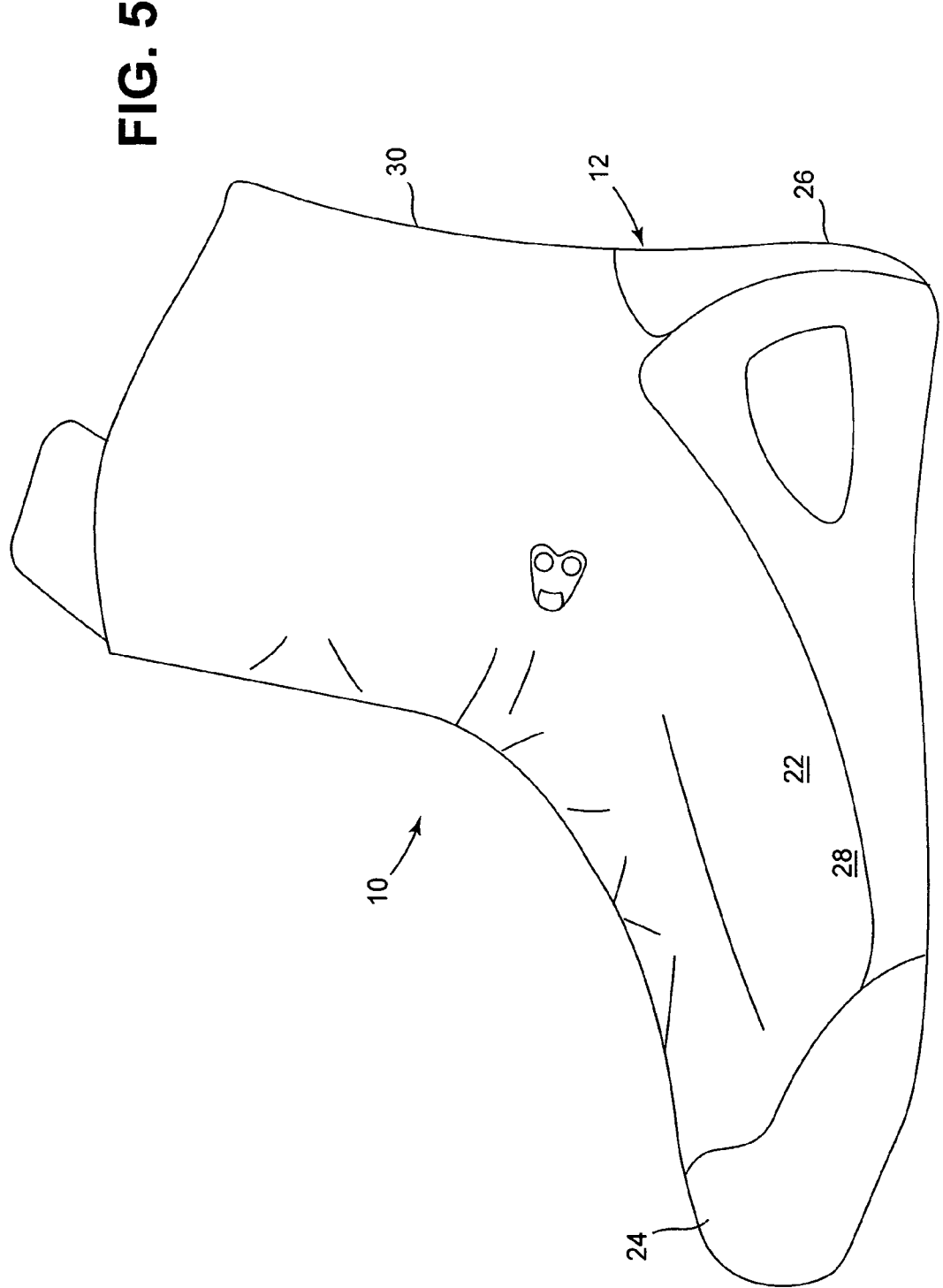
FIG. 5 is a left side view of the boot of FIG. 2.
Figure 6:
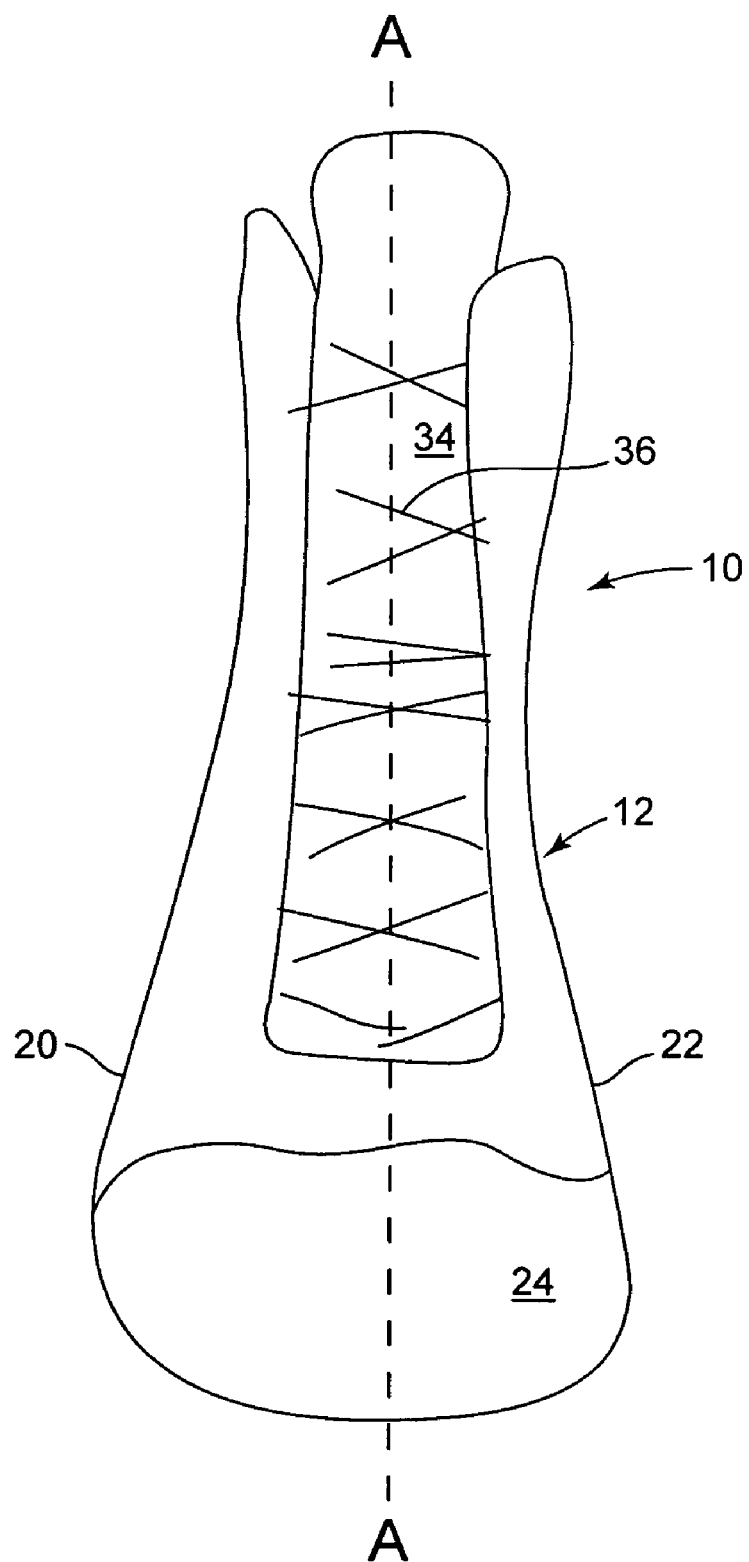
FIG. 6 is a front view of the boot of FIG. 2.

Referring to FIGS. 1-7, a first embodiment of the boot 10 according to the invention is shown. Referring to FIG. 1, the boot 10 includes an upper 12 and a sole 14. The boot 10 is illustrated with the sole 14 removed in FIGS. 2-7. In the depicted embodiment, the boot 10 is right footed. In other words, the boot 10 is configured to fit a person's right foot. The left footed boot is not separately illustrated or described herein as it is a mirror of the right boot 10. The surface of the boot 10 shown in FIGS. 1-2 is herein referred to as the right side 20 of the boot 10, and the surface of the boot 10 shown in FIG. 5 is herein referred to as the left side 22 of the boot 10. The right side 20 and left side 22 of the boot 10 are divided by a line A-A shown in FIG. 6. The right side 20 and the left side 22 join together at the rear 30 of the boot 10 shown in FIG. 7. At the front of the boot 10 laces 36 hold the left and right sides 20, 22 together over the tongue 34 of the boot 10.

The upper 12 of the boot 10 includes an ankle support portion 16 connected to a foot support portion 18. The ankle support portion 16 is positioned above the foot support portion 18 and is for providing support to the ankle as well as for keeping the ankle dry and warm. The foot support portion 18 includes a toe end 24, a heel end 26, and a mid portion 28 therebetween.

In the depicted embodiment a vented compartment 40 for carrying scented material is located adjacent the heel end 26 on the right side 20 of the boot 10. Referring to FIG. 1, an absorbent scented pad 42 is shown as a light colored rectangular member housed within the vented compartment 40. In the depicted embodiment the vented compartment includes a meshed portion 44 bordered by a perimeter 46. In the depicted embodiment the meshed portion is formed of a polymeric material such as a monofilament material. However, it should be appreciated that any material that enables airflow into and out of the vented compartment 40 can be used in place of the depicted mesh portion 44. It should further be appreciated that in place of a separate mesh or grid material, the housing of the vented compartment 40 could be configured to define apertures therein.

The perimeter 46 comprises three sides that form a generally triangular shaped vented compartment 40. The lowest side 52 (the side closest to the sole 14 and farther from the ankle support 16) is stitched onto the right side 20 of the boot 10. In the depicted embodiment the lowest side 52 is also the longest side of the triangular shaped vented compartment 40, and it is arranged generally parallel to the sole 14. The lowest side is not designed to be releasable. In other words, if the lowest side of the perimeter 46 is detached from the boot 10, reattaching it would be inconvenient and require the use of tools.

In contrast, the upper portion of the vented compartment 40 is designed to be releasable. In other words, it is designed to be conveniently opened and closed. A hook and loop fastening system 50 is provided along the upper portions of the perimeter 46 of the vented compartment 40. A snap 48 is provided at the corner where the two shorter sides of the perimeter 46 join together. The snap 48 is configured such that the vented compartment 40 can snap onto the right side 20 of the heel end 26 portion of the boot 10. In the depicted embodiment the perimeter 46 is made of a leather material. It should be appreciated that the perimeter can be made of many other materials including, for example, plastics such as TPU (a thermoplastic polyurethane). It should be further appreciated that many other alternative configurations and fastening mechanisms are also possible.

In the depicted embodiment the right side 20 of the boot 10 is constructed of some materials that would absorb scent. To prevent the boot 10 from retaining the scent of the scented material even after the scent materials are removed, a non-absorbent material 54 is used to line the vented compartment 40 (see FIG. 4). The non-absorbent material 54 in the depicted embodiment includes a rubber construction, and it is stitched to the right side 20 of the boot 10. It should be appreciated that many different materials could be used as the non-absorbent material 54. It should also be appreciated that many other means of attaching the non-absorbent material 54 to the boot 10 are available, for example, the non-absorbent material could also be glued to the boot 10.

Figure 7:
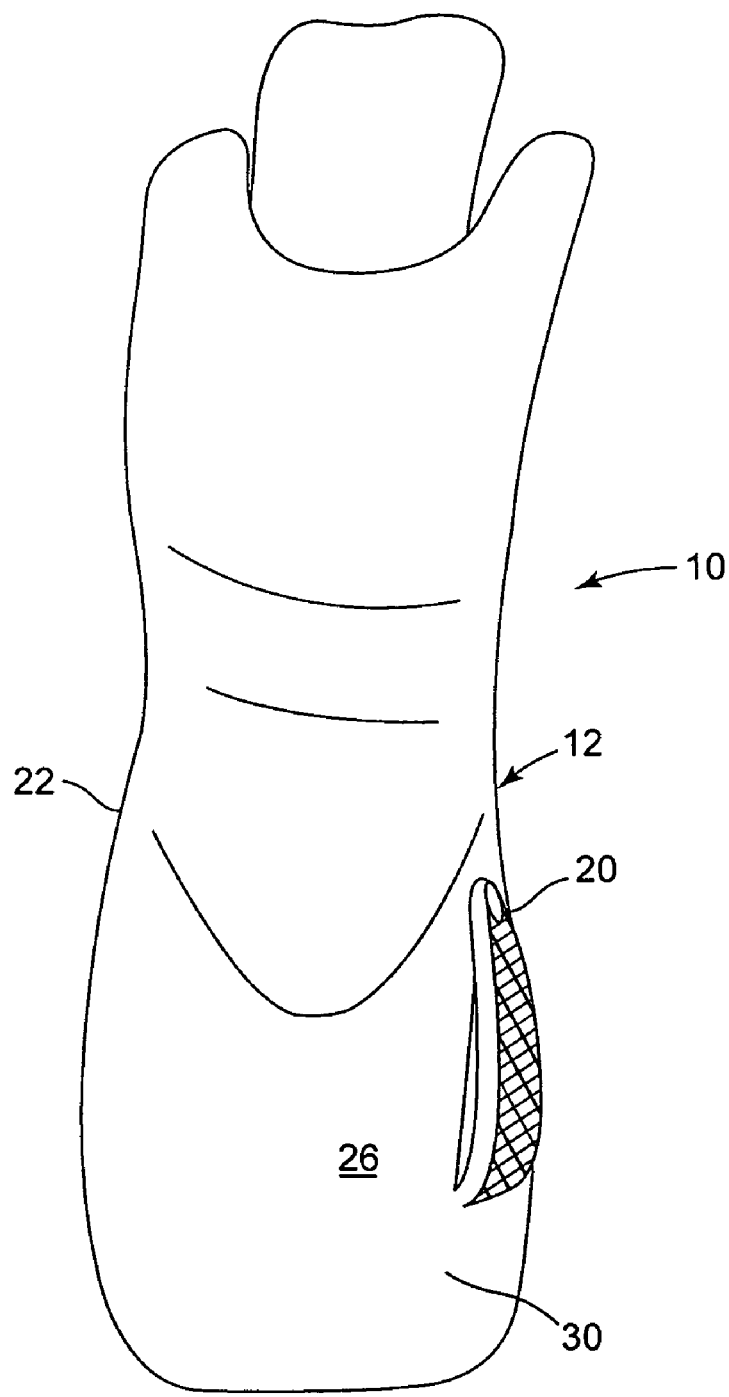
FIG. 7 is a back view of the boot of FIG. 2.
Figure 8:
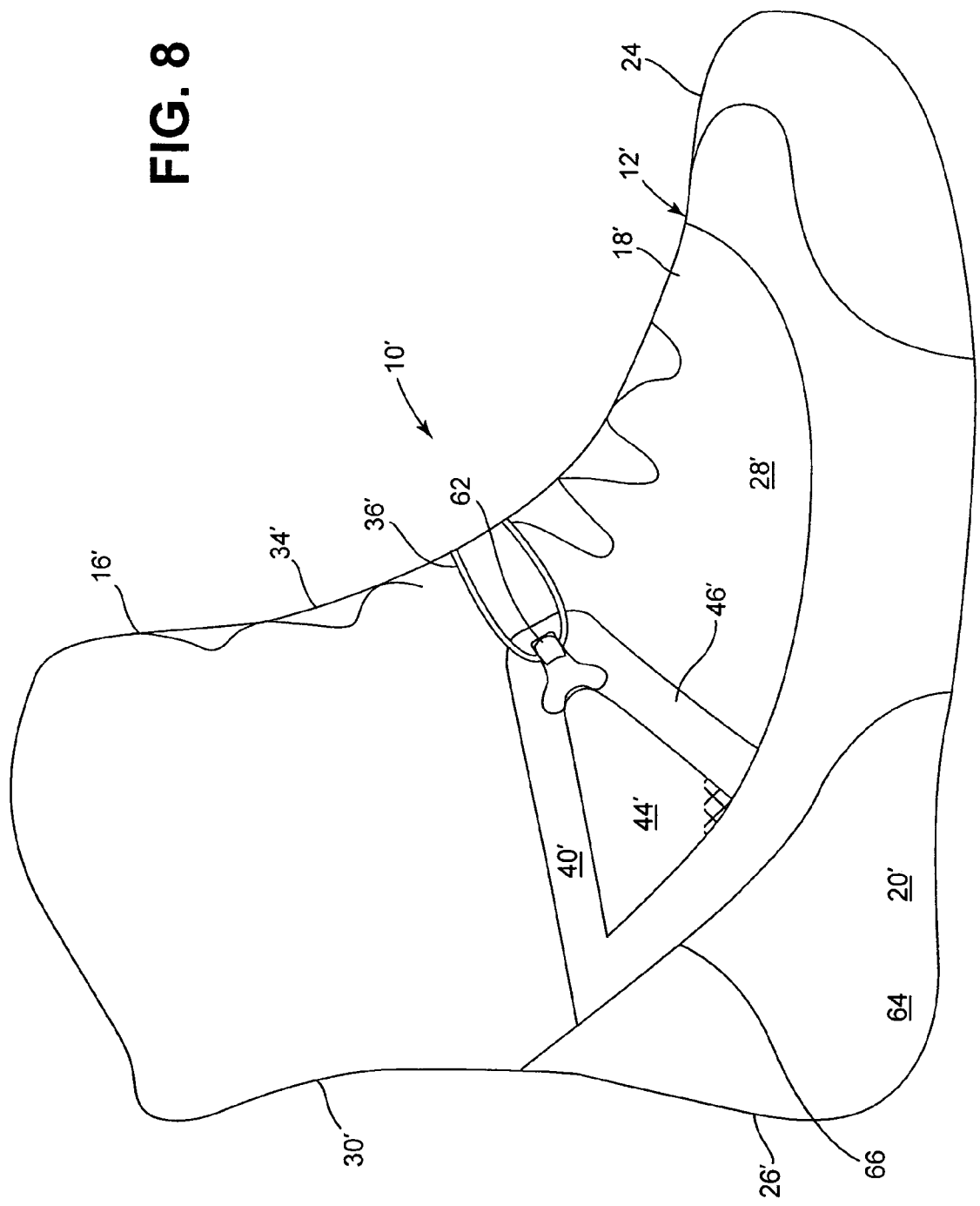
FIG. 8 is a right side view of a right footed boot (with the sole removed) according to a second embodiment of the present disclosure illustrating the scent carrying compartment in an unloaded closed state.
Figure 9:
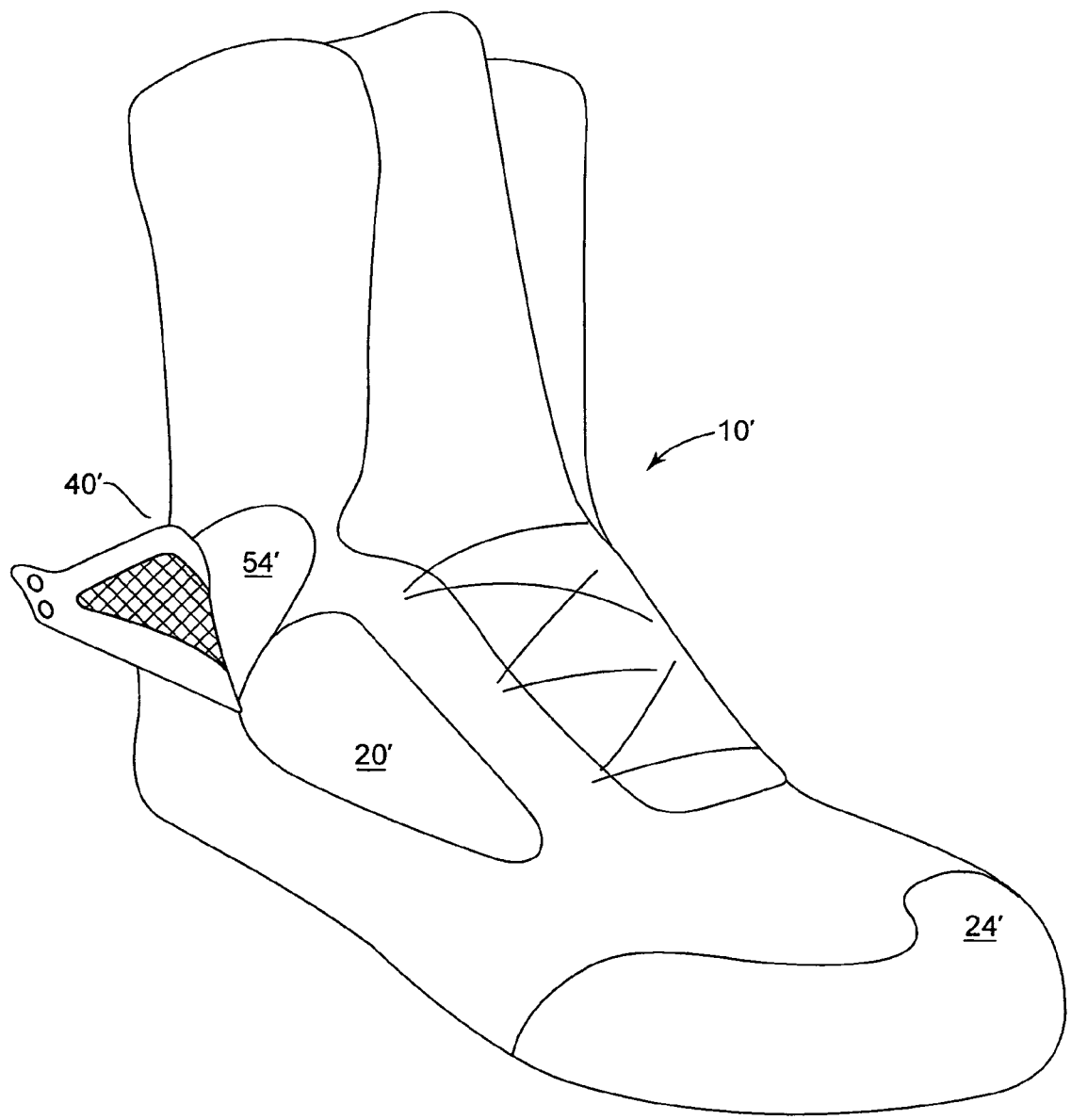
FIG. 9 is a perspective view of the boot of FIG. 8 illustrating the scent compartment in an open state.
Figure 10:
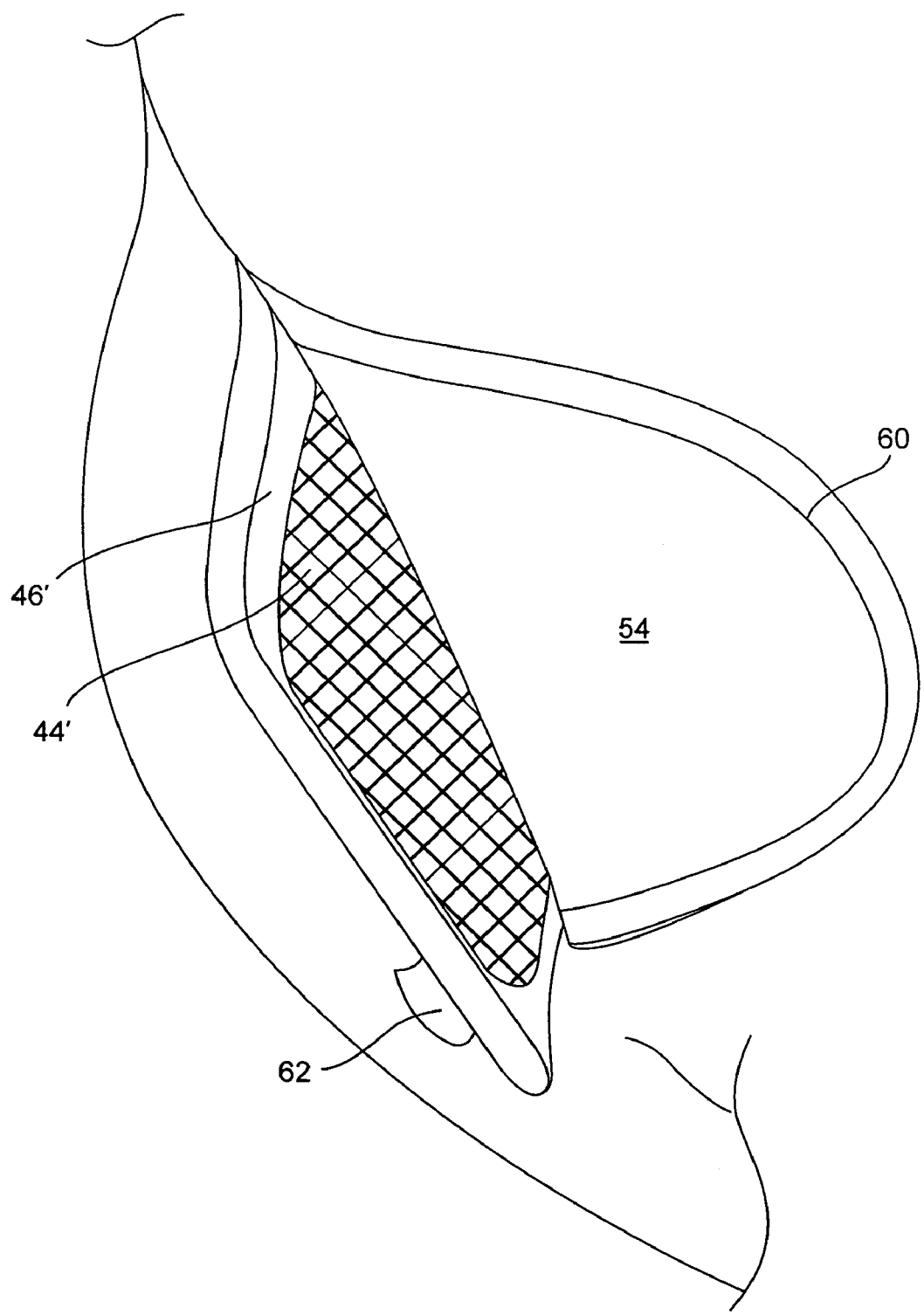
FIG. 10 is a perspective view of a portion of FIG. 9.
Figure 11:
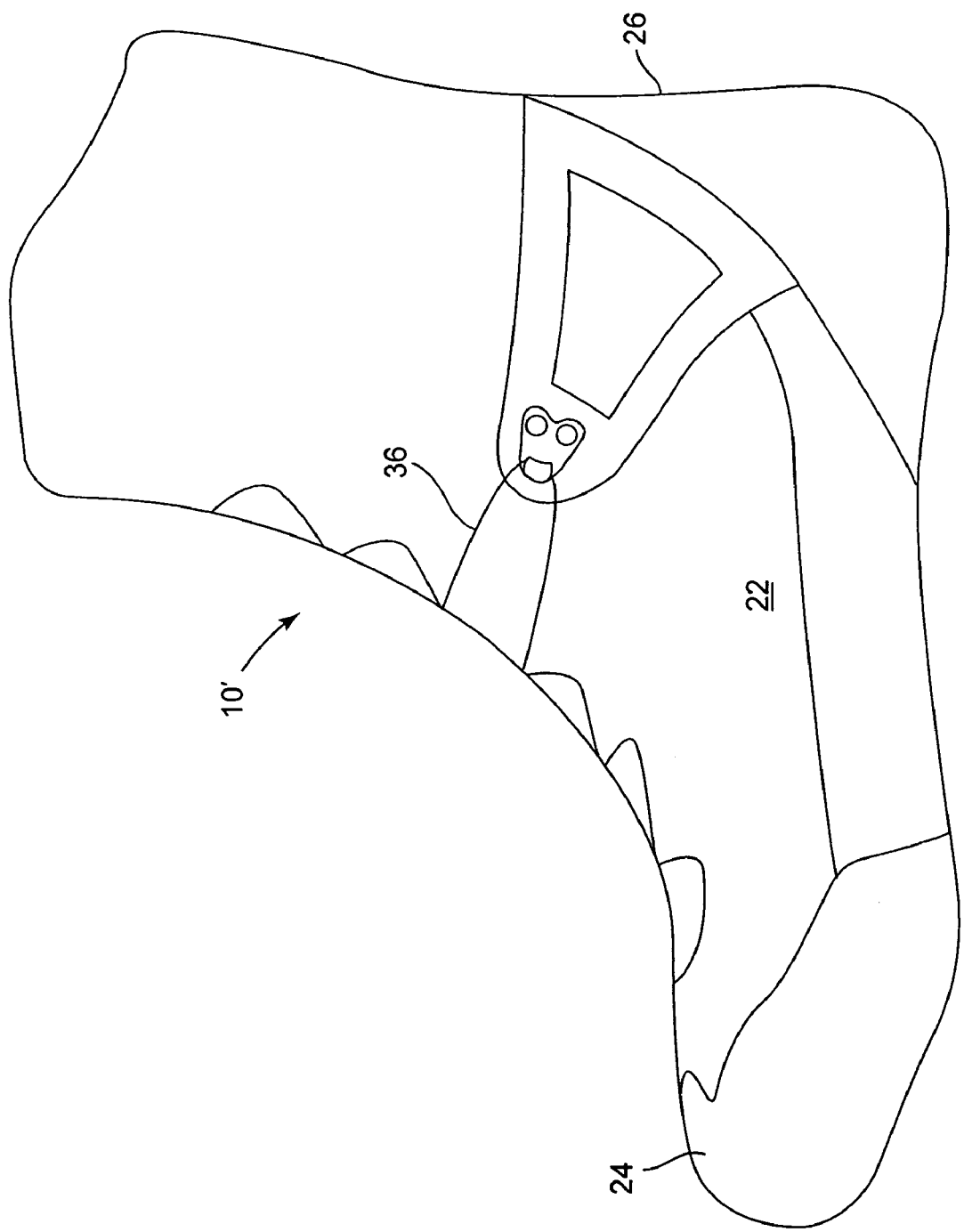
FIG. 11 is a left side view of the boot of FIG. 8.
Figure 12:
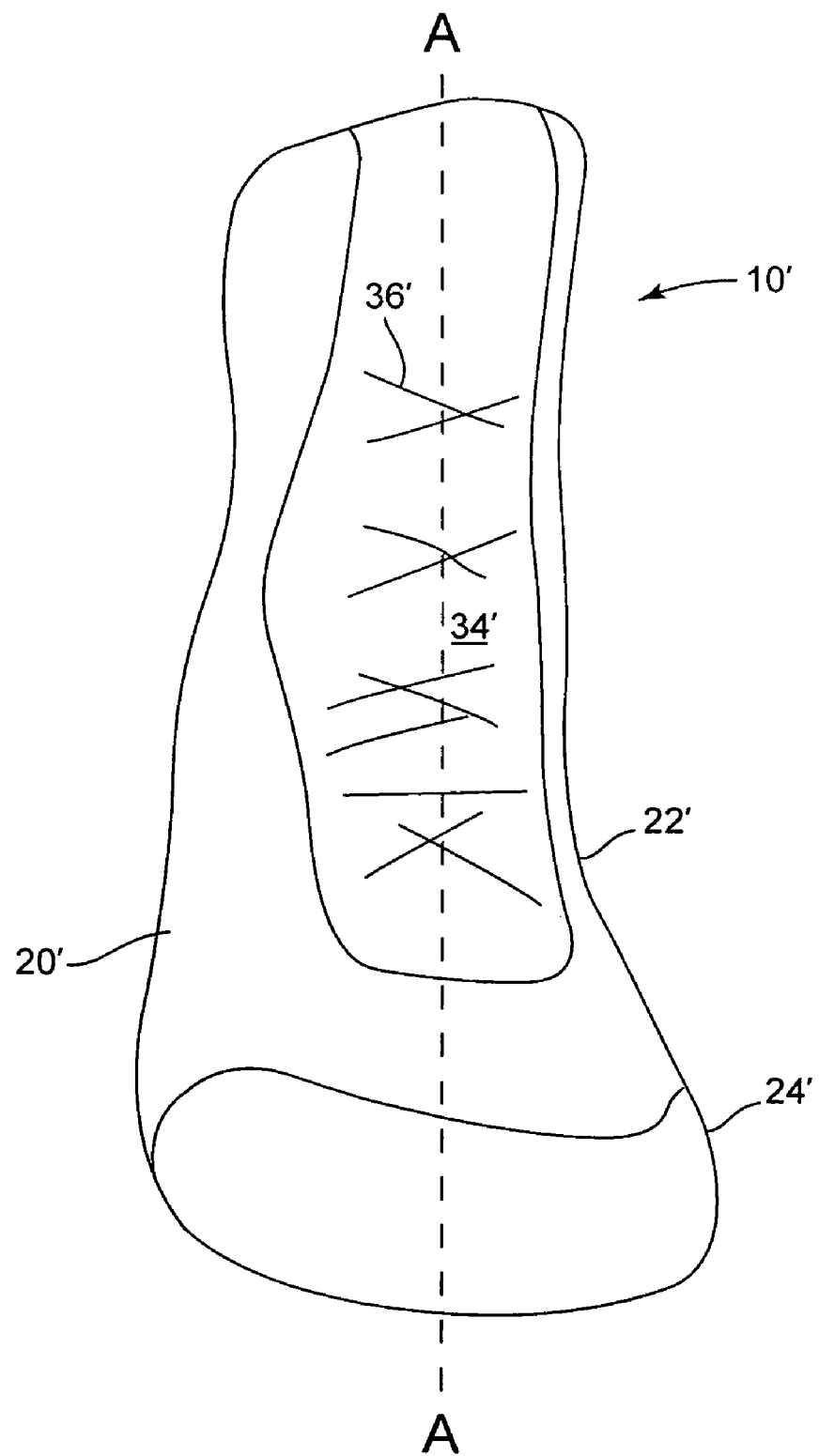
FIG. 12 is a front view of the boot of FIG. 8.
Figure 13:
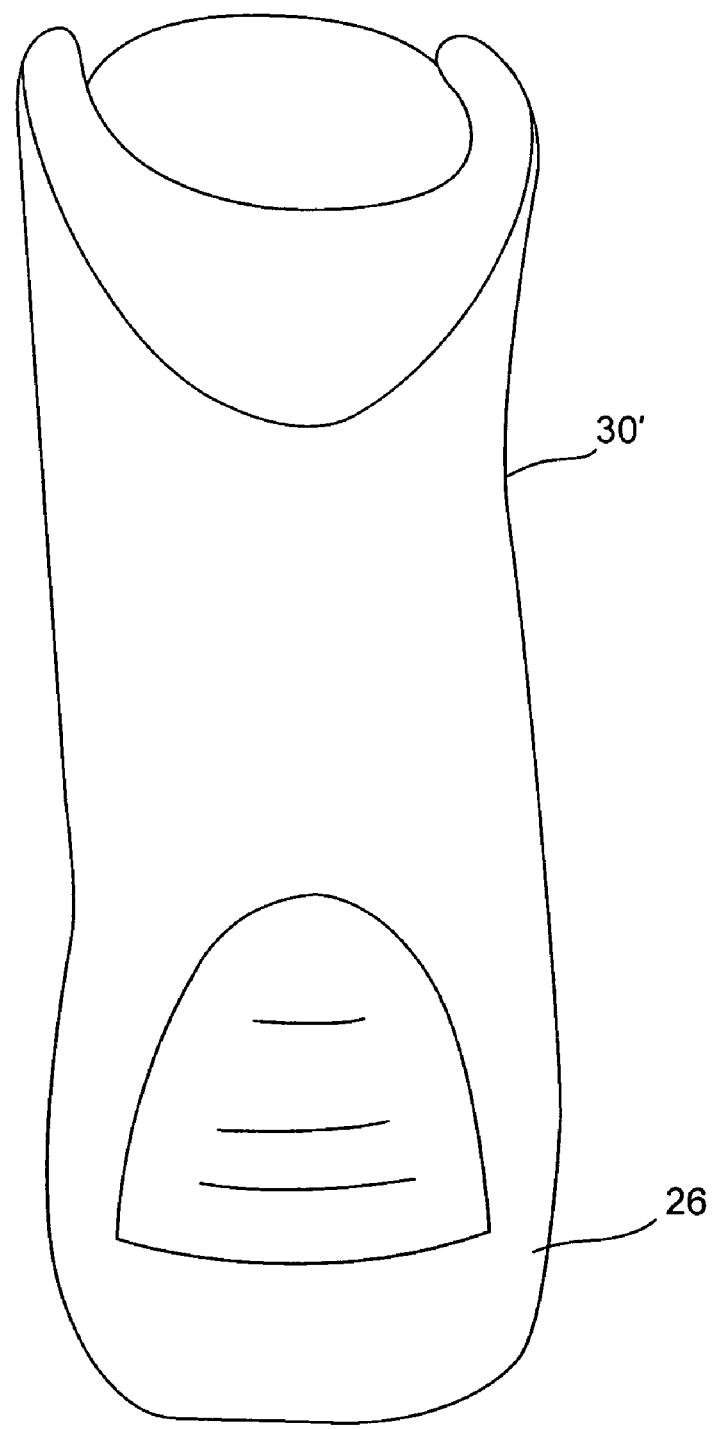
FIG. 13 is a back view of the boot of FIG. 8.
Figure 14:
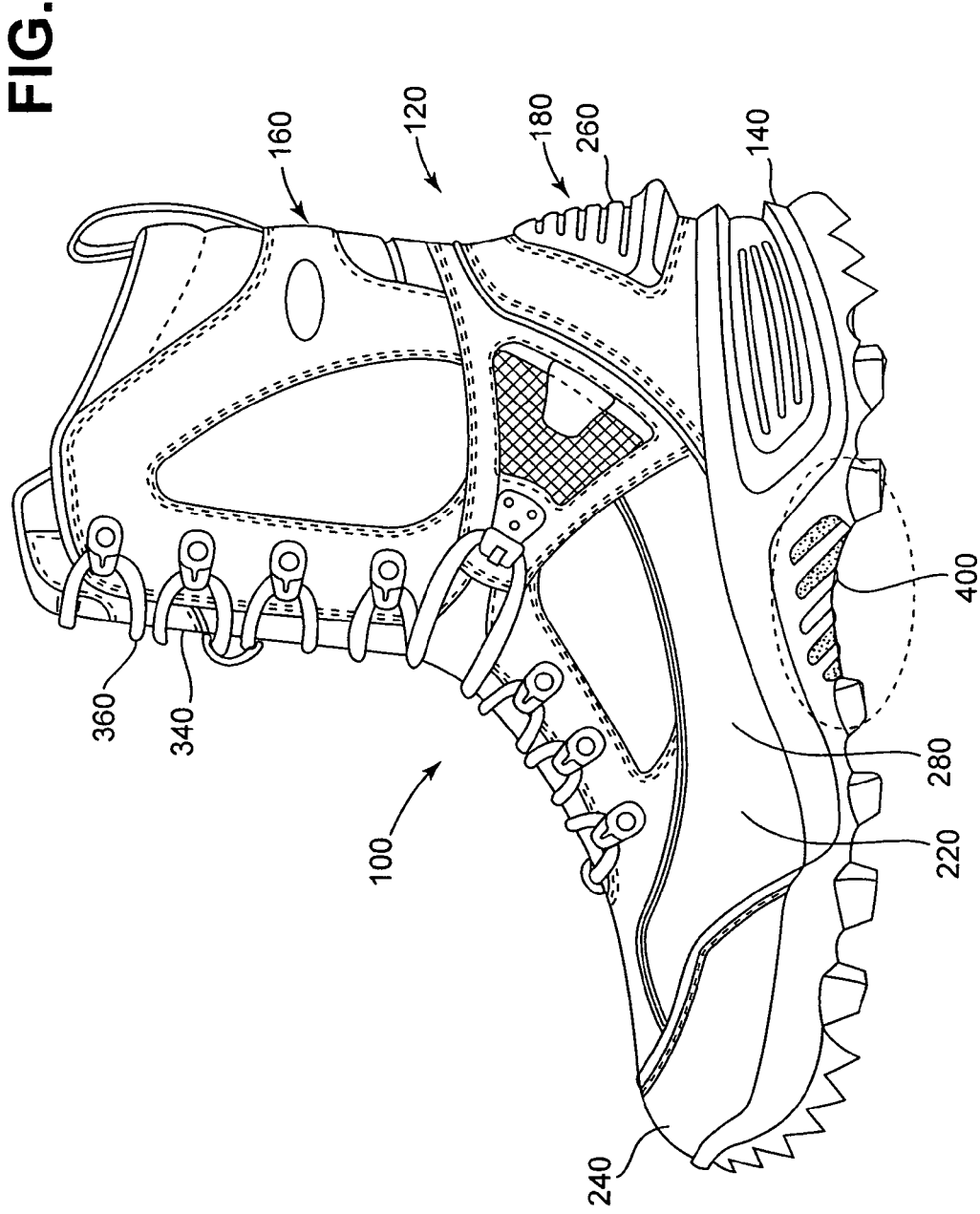
FIG. 14 is a left side view of a left footed boot according to a third embodiment of the present disclosure.

Referring to FIGS. 5 and 7, the left side 22 of the boot 10 does not include a vented compartment 40. It should be appreciated that in alternative embodiments the vented compartment 40 can be located on the left side 22 of the boot 10 rather than the right side 20 of the boot 10. Alternatively, vented compartment 40 could be included on both sides 20, 22 of the boot 10.

Referring to FIGS. 8-14, an alternative embodiment of the boot 10 is shown as boot 10'. Many of the components of the second embodiment of the boot 10' are similar to the components of the first boot 10 embodiment. Such components are referenced with a same number primed. Boot 10' includes an upper 12' that includes an ankle support portion 16' and a foot support portion 18'. The foot support portion 18' includes a heel end 26', a toe end 24', and a mid portion 28' therebetween. The boot 10' includes a right side 20' and a left side 22' that are divided by line A'-A' (see FIG. 12). The left and right sides 20', 22' are pulled against a tongue 34' by laces 36'.

The vented compartment 40' of the second embodiment of the boot 10' is configured differently than in the first embodiment of the boot 10. The vented compartment 40' includes a mesh 44' bordered by a perimeter 46'. The compartment is generally triangular in shape. The non-absorbent material 54' is stitched to the boot 10' under the mesh 44' to lessen the boot's 10' tendency to retain the scent after the scent material (e.g., material 42 shown in FIG. 1) is removed. In the second embodiment, the vented compartment 40' is integrated with an auxiliary ankle support member that engages the laces 36'. The auxiliary ankle support extends from the heel end 26' up towards the laces 36' to provide extra support in the ankle area of the boot 10'. In place of a snap 48 the vented compartment 40' includes a hook 62 (commonly known as a speed hook) at the location where two of the sides of the vented compartment 40' come together. The hook 62 engages the shoe laces 36'. The scented materials can be loaded into the vented compartment 40' when the laces 36' are loosened, and secured in place by lacing up the boot 10'. It should be appreciated that in alternative embodiments the auxiliary ankle support can engage the laces 36' by means other than a hook 62. For example, the laces 36' can engage the auxiliary ankle support via metal or plastic eyelets, D-rings, webbing loops, and cord loops.

In the depicted embodiment the perimeter is constructed of a synthetic rubber material; however, it should be appreciated that other material can also be used. For example, the perimeter can include a plastic construction such as TPU (a thermoplastic polyurethane) construction. One advantage of using TPU or another moldable polymeric material is that the mesh can be co-molded into the perimeter structure, and the perimeter structure can be easily molded into a desired shape and size. In the depicted embodiment the lower edge of the vented compartment 40' is stitched to the right side of the boot 10'. In the depicted embodiment the lower edge is disposed at an angle that is generally parallel to the angle of the forward edge 66 of the heel cup 64.

In the depicted embodiment the mesh 44' has a thickness that is less than the thickness of the perimeter 46'. This difference in thickness contributes to the creation of a cavity between the inner surface of the mesh 44' and the non-absorbent liner material 54', even when the vented compartment 40' is in the closed position. The cavity houses the scented material (shown in FIG. 1). To increase the size of the cavity, a ridge can be provided to space the perimeter 46' away from the liner 54'. The ridge can be provided along line 60 on the non-absorbent liner material 54' shown in FIG. 10. Alternatively, the ridge can be provided on the perimeter 46'. If a ridge is provided, it can be a continuous or a discontinuous ridge. In one embodiment the ridge could comprise a series of raised bumps along the line 60.

In the depicted embodiment the vented compartment 40' is configured such that the scented material can be compressed within the vented compartment 40' by tightening the laces 36', causing a portion of the scented material to protrude through the mesh opening. For example, if the scent is placed on the end of a felt pad or some other malleable material, portions of the felt pad are allowed to protrude (squeezed) through the mesh openings when the pad is secured in place. An advantage associated with this configuration is that the pad material and scent thereon could brush against other surfaces (brush, grass, trees, dirt, rocks, etc.) and disperse the scent by physical contact with the surrounding environment.

In both depicted embodiments, the vented compartments 40, 40' are located at the heel end 26, 26' of the boot 10. Also, in both embodiments the vented compartments 40, 40' are located on the foot support portion 18, 18' rather than the ankle support portion 16, 16'. This location can be advantageous because it is lower on the boot 10, 10' and is therefore less likely to be covered by a hunter's pant leg. At this location, the compartment is exposed to air flow and is able to leave a scent trail as the hunter moves through the hunting environment. Also, the location does not interfere with the normal function of the boot. Though the depicted position has some advantages described above, it should be appreciated that in alternative embodiments the vented compartment can be located anywhere on the boot 10 including the toe end of the boot 24, 24' or the ankle support portion of the boot 16, 16'.

The shape of the vented compartment 40, 40' in both embodiments is generally triangular. Also, the mesh 44, 44' in both embodiments is entirely surrounded by a perimeter 46, 46'. It should be appreciated that in alternative embodiments the mesh material may not be entirely surrounded, and the perimeter 46, 46' and the vented compartment 40, 40' can be of any shape (e.g., rectangular, trapezoidal, circular, etc.). For example, in an alternative embodiment the vented compartment may have only one side that can be accessed, and the scented material can be slid into and out of that side. Instead of a hook and loop system, the side can be held in a normally closed position via an elastic strap. Also, in other alternative embodiments the perimeter material can be elastic to enable the vented compartment to expand when loaded with scented material.

Referring to FIGS. 14-19B, a third alternative embodiment of the boot 10 is shown as boot 100. Many of the components of the third embodiment of the boot 100 are similar to the components of the first boot 10 embodiment. Such components are referenced with a same number plus 100. Boot 100 includes a sole 140 and an upper 120. The upper 120 includes an ankle support portion 160 and a foot support portion 180. The foot support portion 180 includes a heel end 260, a toe end 240, and a mid portion 280 therebetween. The boot 100 includes a right side 200 and a left side 220 that are divided by bisecting line B-B (shown in FIG. 17). The left and right sides 200, 220 are pulled against a tongue 340 by laces 360.

The vented scent compartment 400 is located in the sole 140 under the mid portion 280 of the upper 120. The location on the sole 140 is particularly advantageous because the sole 140 typically undergoes less abuse than the sole at the toe end 240 and heel end 260 of the boot 100. Nonetheless, it should be appreciated that in an alternative embodiment the vented compartment 400 can be located in many other locations on the boot 100 including on the upper 120 of the boot 100 or the toe end and/or heel end of the sole 140. The vented compartment 400 in the depicted embodiment can be molded into the sole 140 and have a mesh- or grid-like outer cover 70. Other portions of the outer surface 72 of the vented compartment 400 can also include a grid-like construction to allow fluid flow (liquid and/or air) from the compartment as shown in FIGS. 14-23. The cover 70 and some other portions of the vented compartment 400 in the depicted embodiment can be constructed of a TPU material. In should be appreciated that many other materials can also be used (e.g., nylon, metal, composites, or wood) in the construction of the vented compartment 400.

Figure 17:
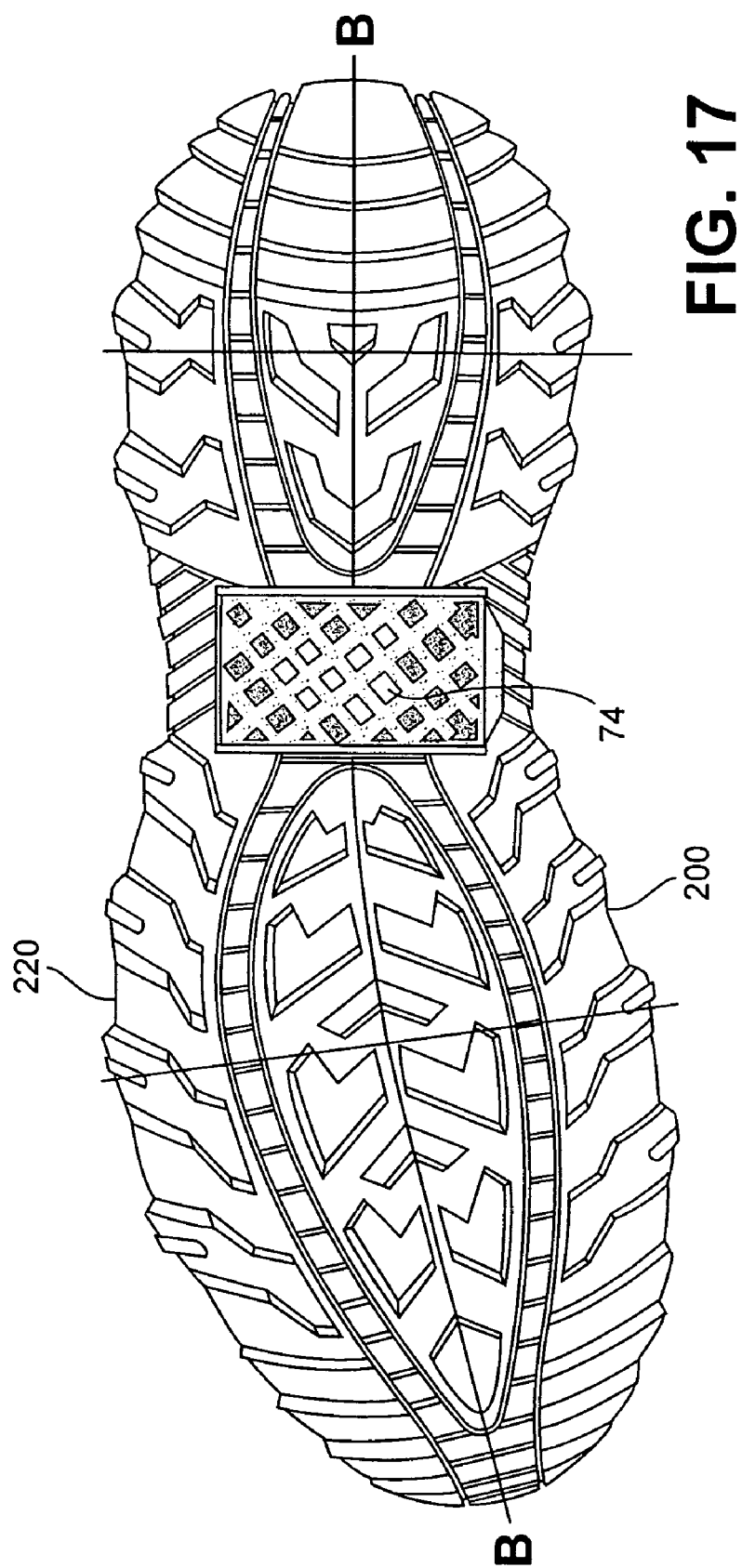
FIG. 17 is a bottom view of the boot of FIG. 14 with the compartment in the closed position.
Figure 18:
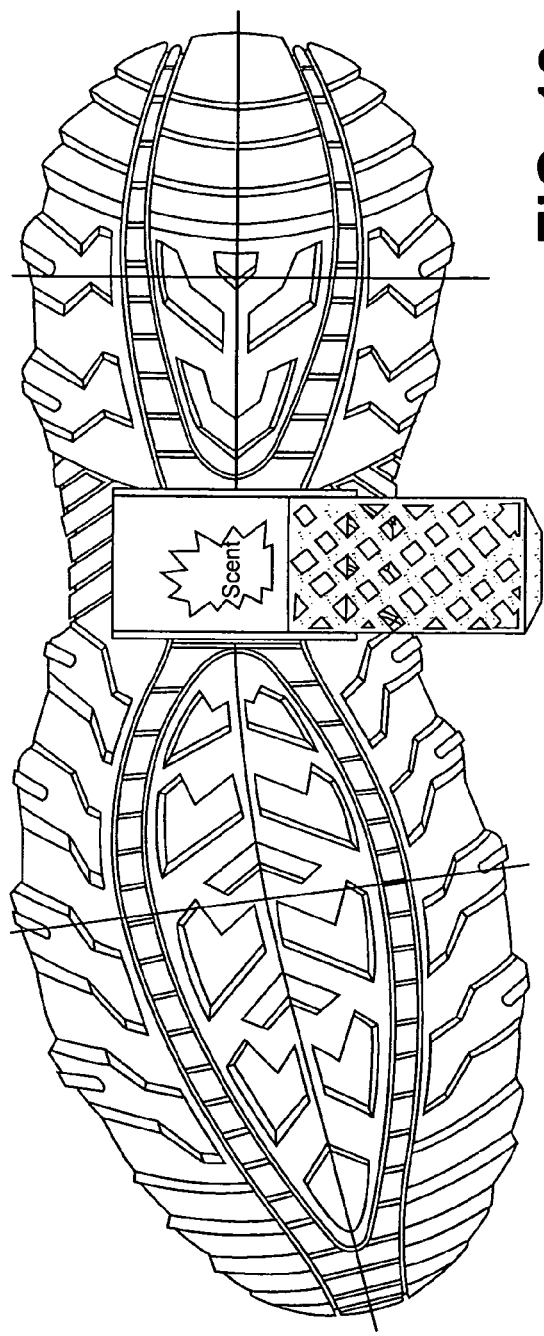
FIG. 18 is a bottom view of the boot of FIG. 14 with the compartment in the open position.
Figure 19B:
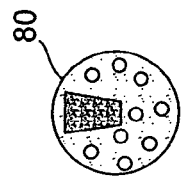
FIGS. 19A and 19B are alternative embodiments of a portion of FIG. 14.
Figure 19A:
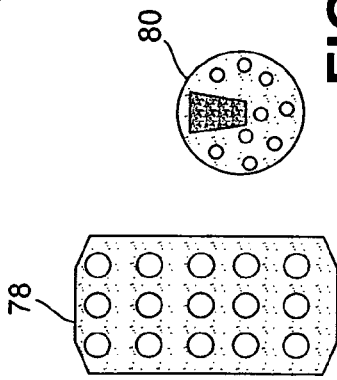

Referring to FIGS. 17 and 18, a scented material 74 is shown housed within the vented compartment 400. In the depicted embodiment the edges of the cover 70 are configured to slide into and out of grooves 76 on the vented compartment 400 and latch in the closed position. FIG. 18 shows the cover 70 slid open. In alternative embodiments, some of which are described below, the cover could swing open or rotate open. The cover 70 can include many different grid configurations and they can be in various shapes and sizes. For example, see FIG. 19A showing cover 78 having circular vent holes and FIG. 19B showing a cover 80 in a circular shape.

Figure 20:
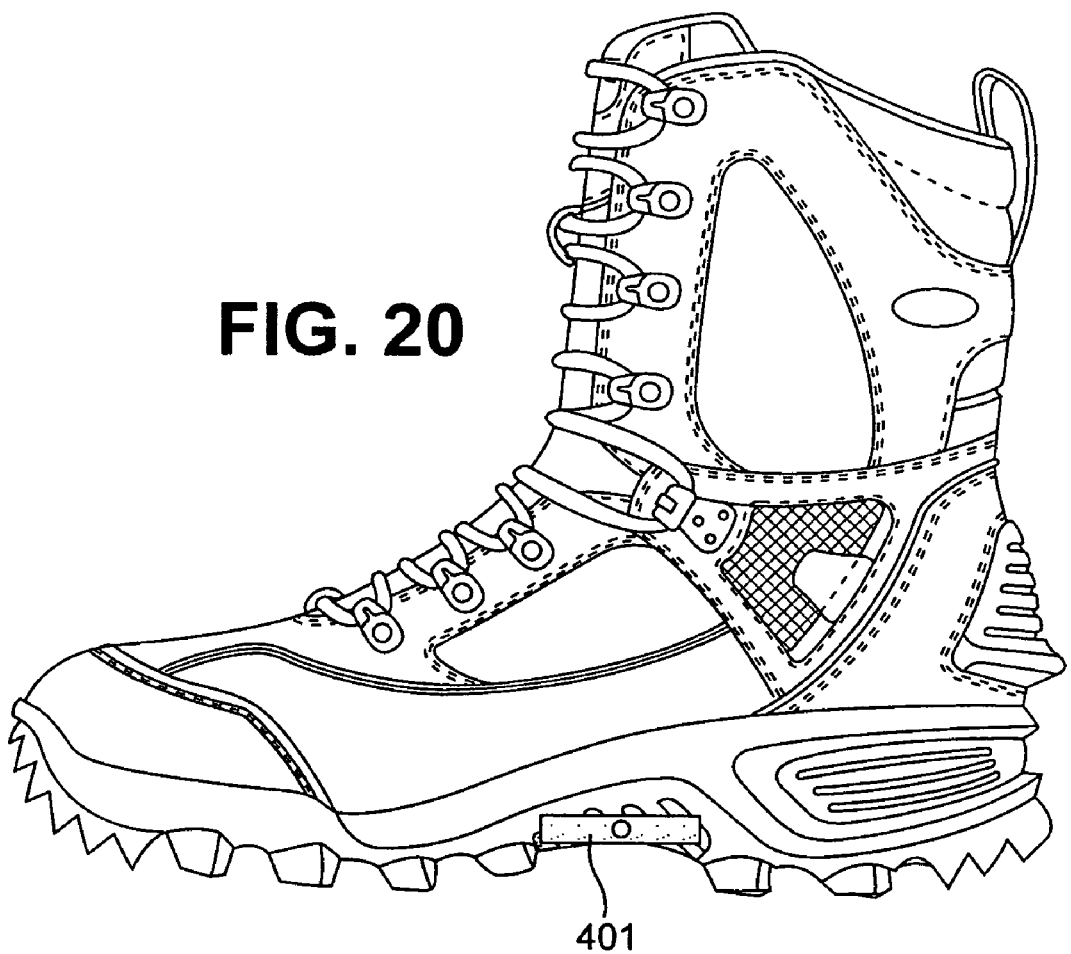
FIG. 20 is a left side view of a left footed boot according to a fourth embodiment of the present disclosure.
Figure 21:
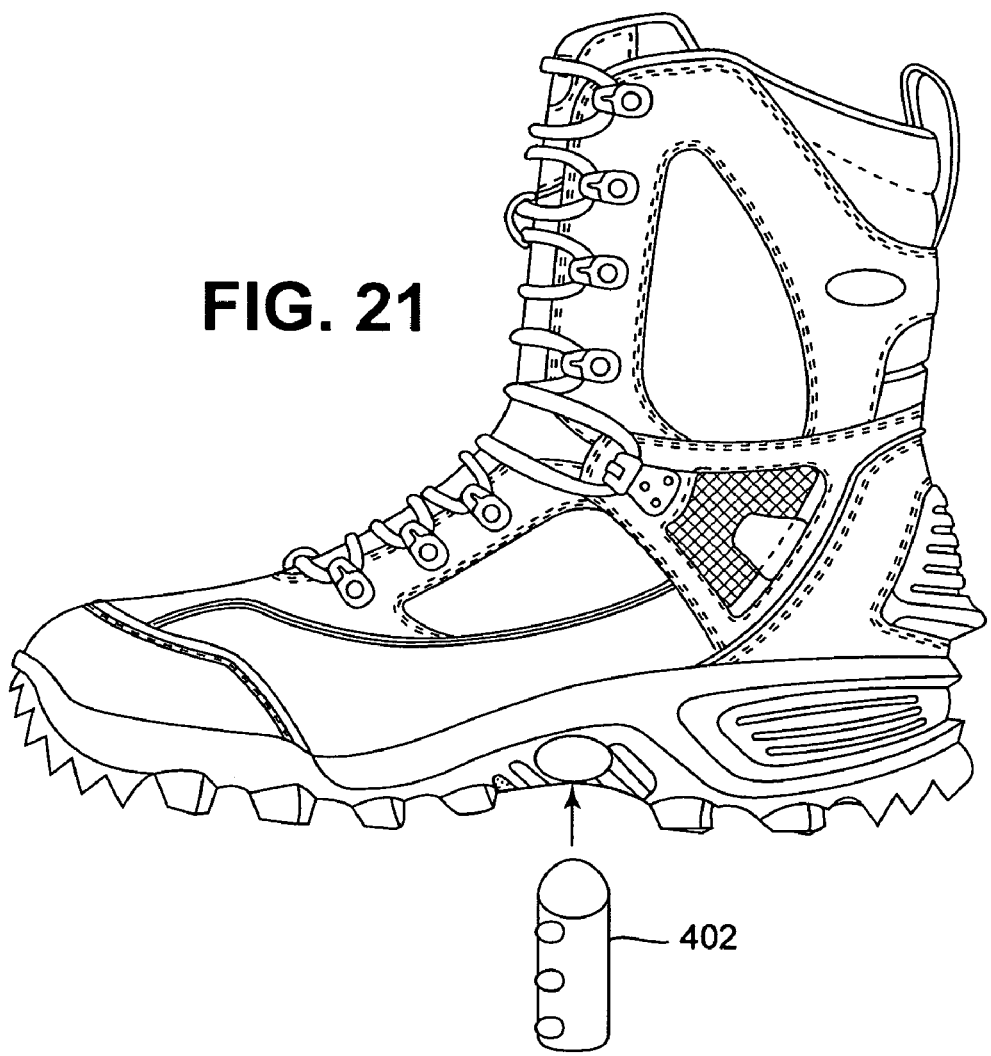
FIG. 21 is a left side view of a left footed boot according to a fifth embodiment of the present disclosure.

Referring to FIGS. 20 and 21, a fourth and a fifth alternative embodiment are shown. In the depicted embodiment the vent compartment 401 is pulled open and closed like a dresser drawer. The cross sectional shape of the portion that opens and closes is rectangular shaped. The scented material is housed within the drawer which is perforated to allow the scent of the scented material to escape therefrom. Referring to FIG. 21, the cross sectional shape of the vented compartment 402 is cylindrical rather than rectangular. In the depicted embodiment, the vented compartment 402 includes perforations configured such that rotating the vented compartment 402 to a first position allows the scent to freely escape from the chamber, and rotating the vented compartment 402 to a second position impedes the escape of the scent from the vented compartment 402. When in the first position, the apertures on the cylindrical shaped member are at least partially aligned with apertures in the outer surface of the vented compartment 402, thereby exposing the scented material to air flow.

Figure 22:
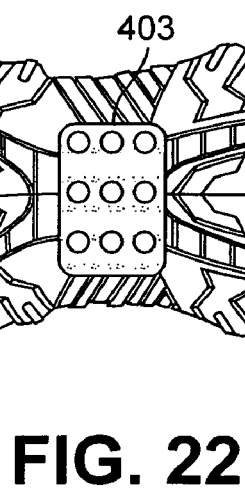
FIG. 22 is a bottom view of the left footed boot according to a sixth embodiment of the present disclosure.

Referring to FIG. 22, a sixth embodiment of the vented compartment 403 is shown. In the depicted embodiment the vented compartment 403 is not removable. The vented compartment 403 houses an absorbent material therein that the hunter can charge with scent by dripping liquid scent into the compartment through, for example, one of the plurality of holes therein.

Figure 23:
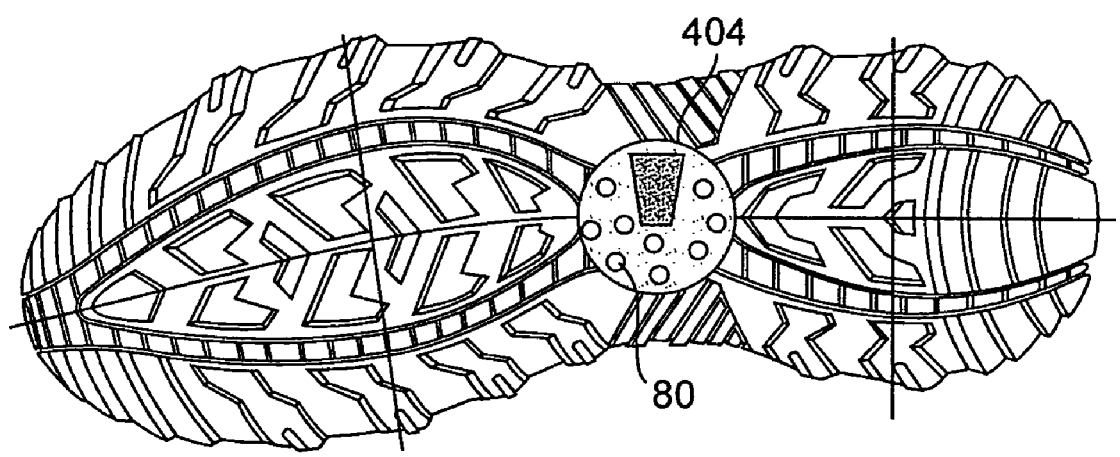
FIG. 23 is a bottom view of the left footed boot according to a seventh embodiment of the present disclosure.

Referring to FIG. 23, a seventh embodiment of the vented compartment 404 is shown. In the depicted embodiment the vented compartment 404 includes a perforation cover 80 that can be aligned, partially aligned, or misaligned with apertures in the compartment 404 to adjust the flow of scent out of the vented compartment 404. It should be appreciated that the features of any embodiment can be combined with the features of any other embodiment. For example, the sixth and seventh embodiments can be combined into another embodiment where the absorbent material is permanently held within the boot, but the scent compartment can be opened to allow the free flow of scent and closed to impede the scent from escaping from the boot.

Figure 24:
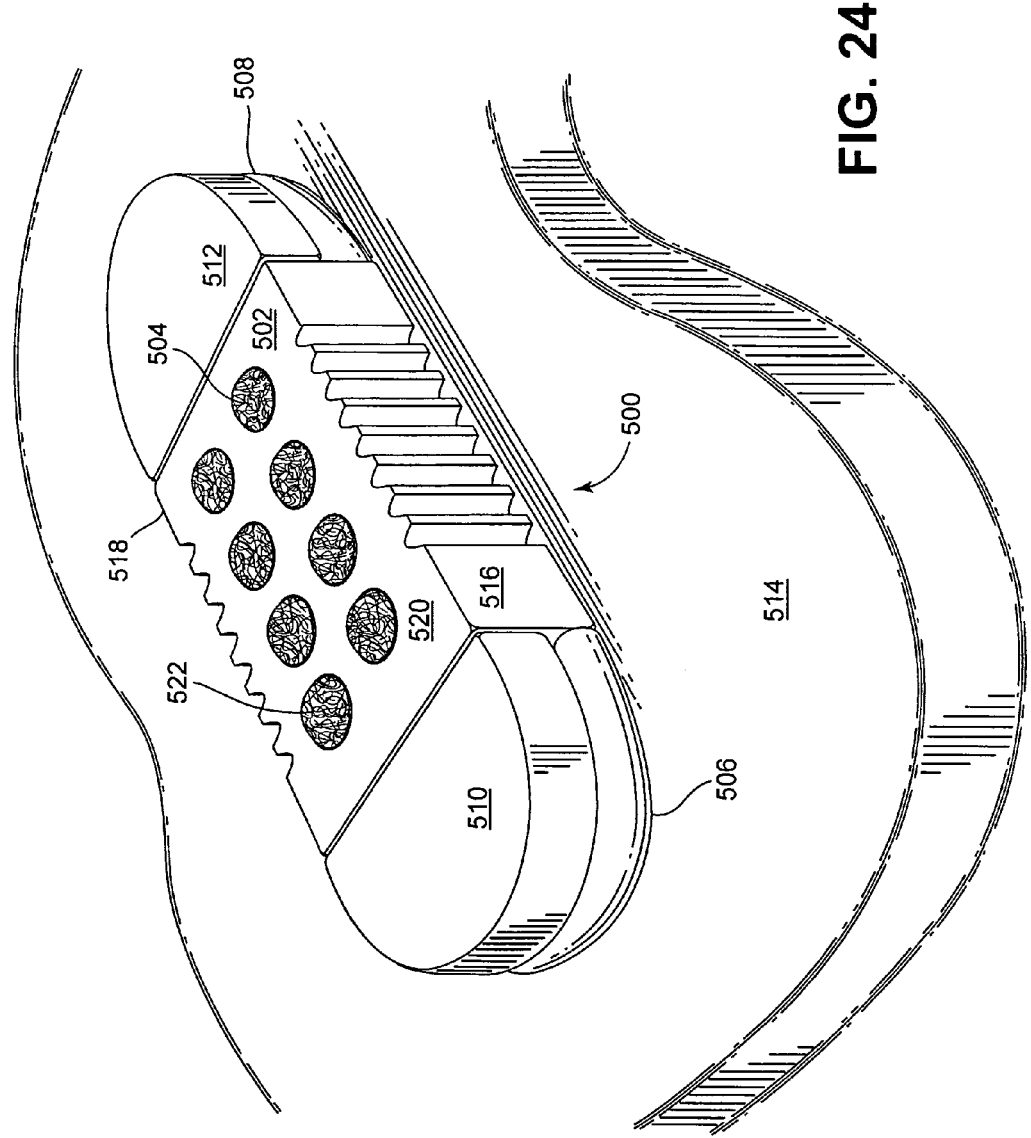
FIG. 24 is a perspective view of an eighth embodiment of the present disclosure.
Figure 25:
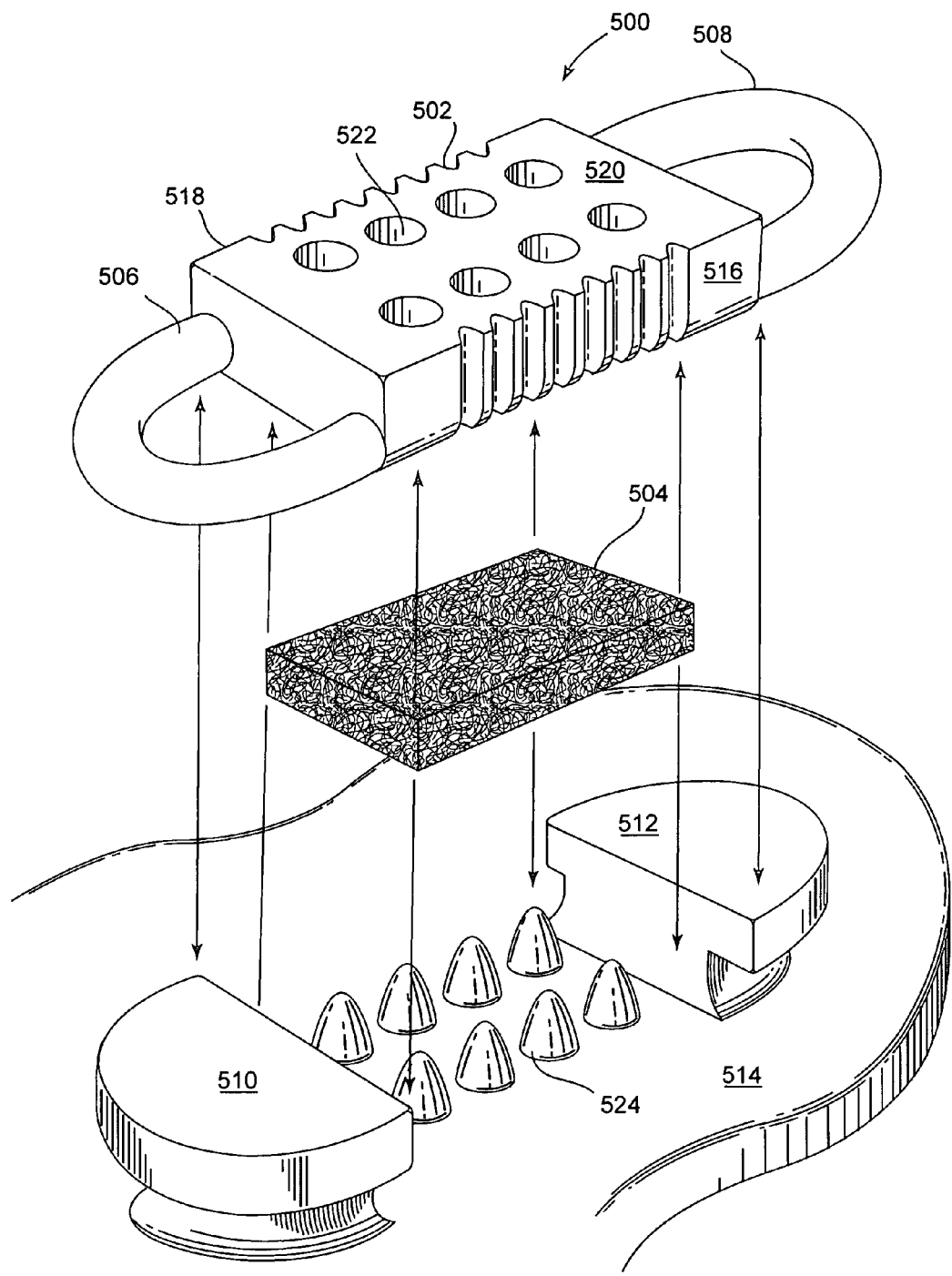
FIG. 25 is an exploded perspective view of the embodiment shown in FIG. 24.
Figure 26:
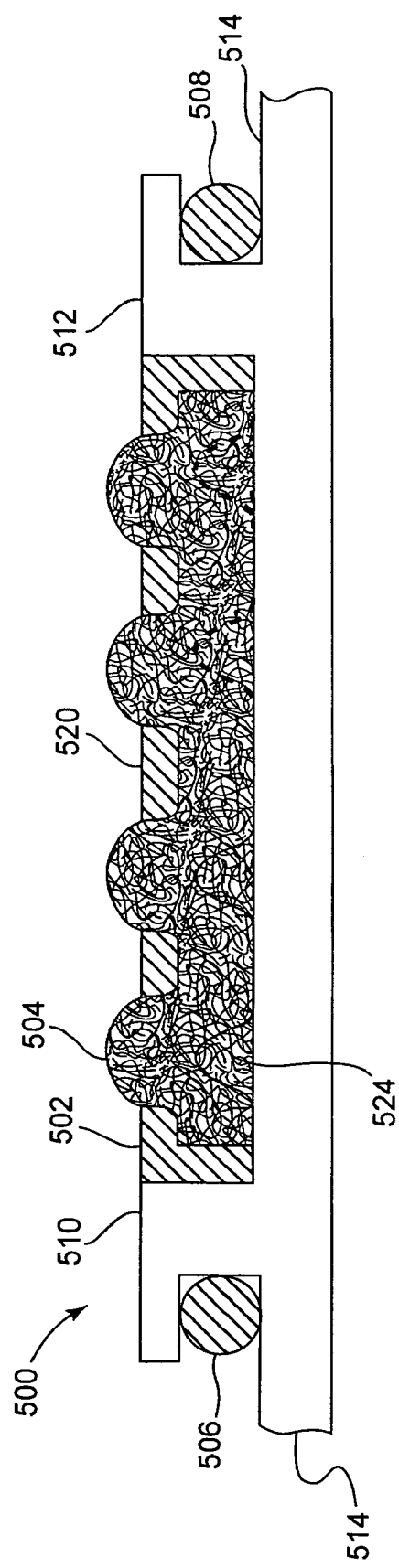
FIG. 26 is cross sectional view of a portion of the embodiment shown in FIG. 24.

Referring to FIGS. 24-26, an eighth embodiment of a vented compartment 500 is shown. In the depicted embodiment, the vented compartment is configured to be attached to an exterior surface 514 of a boot (it should be appreciated that the term boot is used herein to refer to any type of footwear). The exterior surface 514 could be any surface of the boot. In one embodiment the exterior surface is the outer sole surface of the boot adjacent the instep (i.e., the bottom of the boot between the toe portion and the heel portion). The vented compartment includes a body portion 502 that houses a scented material 504 and opposed elastic loops 506, 508 configured to removably attach the body portion 502 to bosses 510, 512 on the boot surface 514. The scented material 504 can be a scented felt material which is placed into the body portion 502 of the vented compartment prior to stretching the elastic members 506, 508 over the bosses 510, 512. In the depicted embodiment the body portion 502 is rectangular shaped and includes opposed grooved side surfaces 516, 518 for added grip. The body portion includes a top outer facing surface 520 that includes apertures therein to allow the scent from the scented material 504 to escape. In the depicted embodiment, the apertures consist of two columns of circular shaped holes. In particular, the holes are configured such that a portion of the scented material 504 protrudes therefrom. In the depicted embodiment the outer surface 514 of the boot includes a plurality of protrusions 524 positioned between the bosses 510, 512. The protrusions 524 push against portions of the scented material 504 so that the scented material 504 protrudes from the top surface 520 of the body portion 502 of the vented compartment 500. The protrusions 524 in the depicted embodiment are laid out on the outer surface 514 to match up with the apertures 522. It should be appreciated that in alternative embodiments of the vented compartment 500 the protrusions 524 can be arranged differently or completely eliminated.

Figure 27:
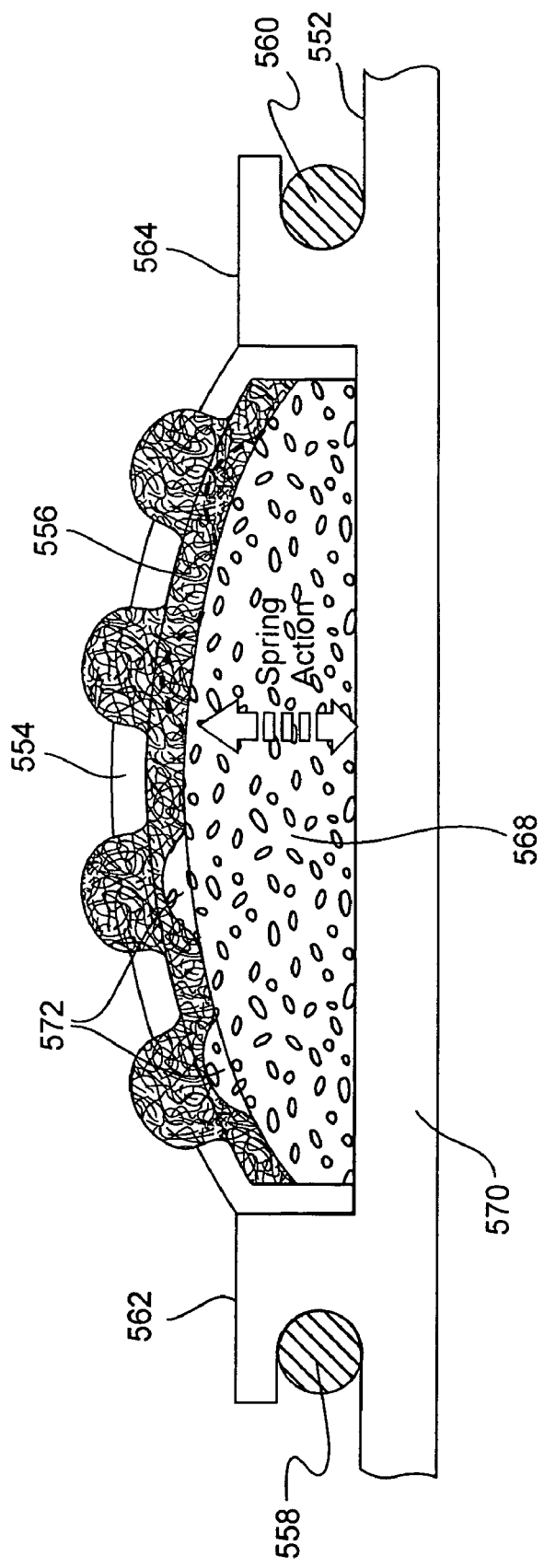
FIG. 27 is a cross sectional view of an ninth alternative embodiment of the present disclosure.

Referring to FIG. 27, a ninth embodiment of a vented compartment 550 is shown. The vented compartment 550 is generally similar to the vented compartment 500. The vented compartment 550 is configured to be attached to an exterior surface 552 of the sole 570 of a boot. The vented compartment includes a body portion 554 that houses a scented material 556 and opposed elastic loops 558, 560 configured to removably attach the body portion 554 to bosses 562, 564 on the boot surface 552. The body portion 554 includes an outer facing surface that includes apertures therein to allow the scent from the scented material 556 to escape. In the depicted embodiment, a resilient material 568 (e.g., foam, rubber, etc.) is positioned between the outer surface 552 of the boot and the scented material 556. The resilient material 568 is dome-shaped and is configured to push against portions of the scented material 556 so that the scented material 556 protrudes from the top surface of the body portion 554 of the vented compartment 550. The resilient material could include surface features 572 that match up with the apertures on the outer facing surface of the body portion 554 of the vented compartment 550. The depicted configuration enhances contact between the scented material 556 and the ground surface.

Referring to FIGS. 28-30, a tenth embodiment of a vented compartment 600 is shown. The vented compartment 600 is molded to the bottom surface 602 of the boot 604. It should be appreciated that alternative attachment/mounting means are possible. In the depicted embodiment the vented compartment 600 is located in the mid portion of the sole between the toe and the heel of the boot 604. In the depicted embodiment the vented compartment 600 is generally rectangular with four sides 606, 608, 610, 612 and a cover 614. The cover 614 includes a number of square shaped apertures 618 and is connected to the side 612, for example, via a living hinge 616. When the scented material 620 is secured inside the vented compartment 600, portions of the scented material can extend out of the cover (see FIG. 29).

Figure 31:
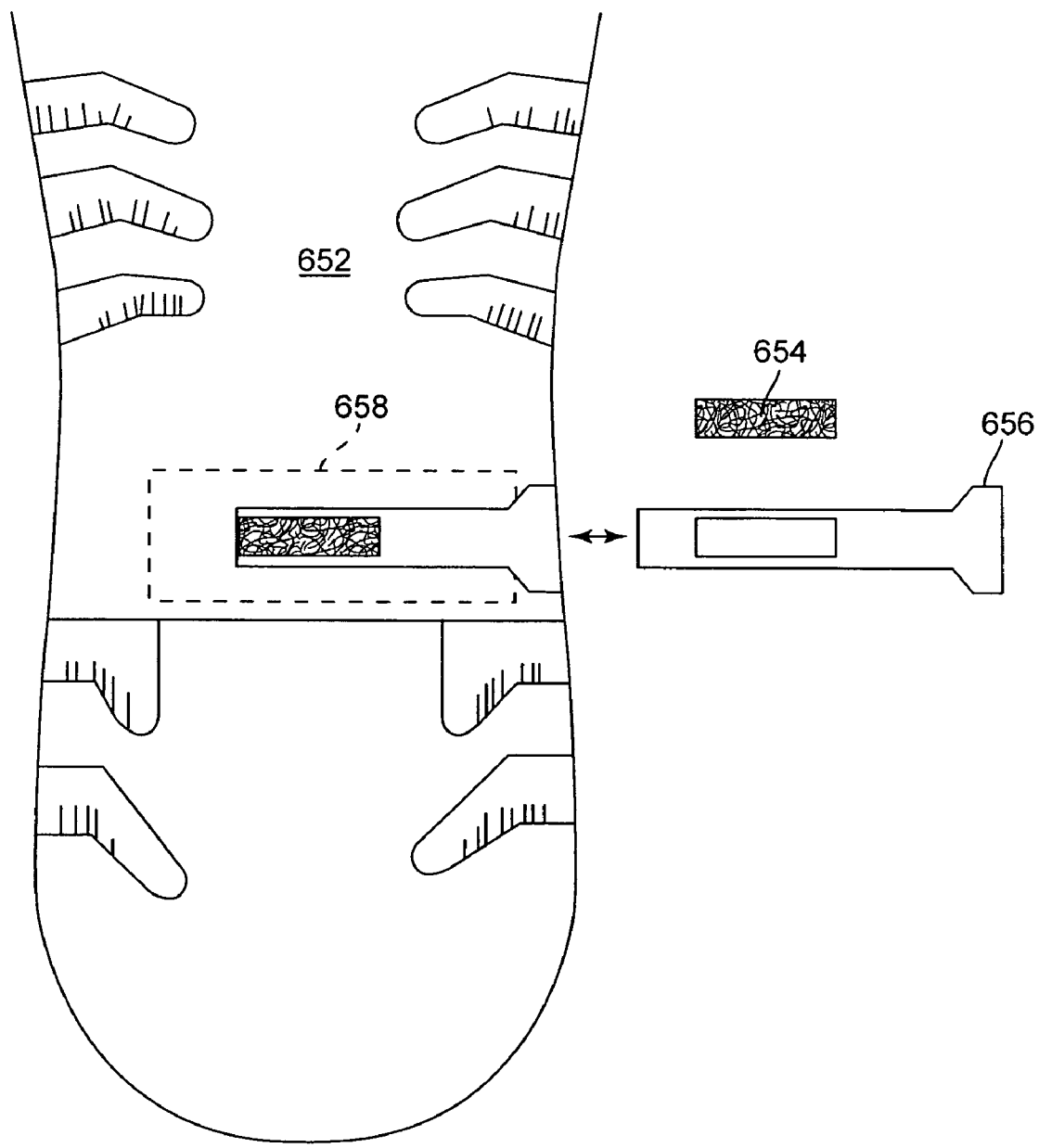
FIG. 31 is a schematic illustration of an eleventh alternative embodiment of the present disclosure.
Figure 37:
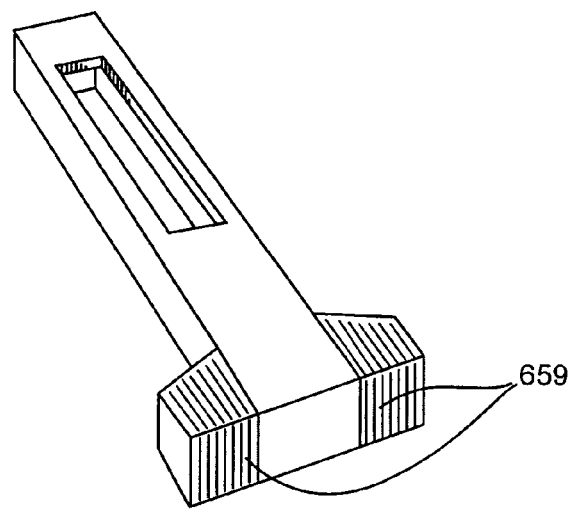
FIG. 37 is a perspective of an alternative embodiment of the insert of FIG. 31.

Referring to FIGS. 31-33, an eleventh embodiment of the vented compartment 650 is shown. In the depicted embodiment, the vented compartment 650 is located in the sole 652 of the boot. The vented compartment is configured such that portions of the scented material 654 are exposed to the ground when secured in the boot. The scented material 654 is partially housed in an insert 656 that is slidably received in the sole 652. In the depicted embodiment the insert includes an elongated body portion 660 and a handle portion 662. The handle portion 662 can include ridges for gripping (see the textured surface 659 shown in FIG. 37). In the depicted embodiment a receptacle 658 is shown molded into the boot. The receptacle 658 is configured to mate with the insert 656 and secure the scent material 654 in the boot. In the depicted embodiment, the receptacle forms a channel which is sized to receive the insert.

Figure 34:
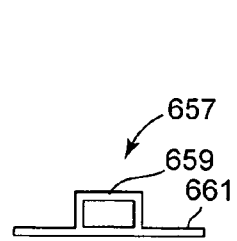
FIG. 34 is an end view of an alternate embodiment of the receptacle of FIG. 31.
Figure 35:
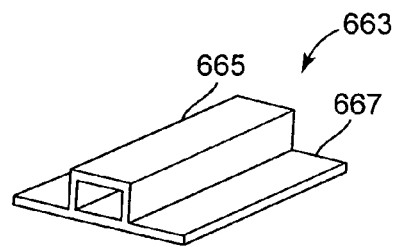
FIG. 35 is a perspective view of an alternate embodiment of the receptacle of FIG. 31.
Figure 36:
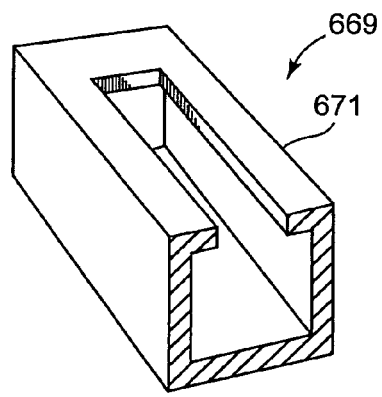
FIG. 36 is a perspective view of an alternate embodiment of the receptacle of FIG. 31.

FIGS. 34-36 illustrate several alternate configurations of the receptacle 658. The receptacle 657 of FIG. 34 includes a slotted body portion 659 between two flanges 661. The receptacle 663 of FIG. 35 includes an unslotted body portion 665 between two flanges 667. The receptacle 663 of FIG. 35 includes an unslotted body portion 665 between two flanges 667. The receptacle 669 of FIG. 35 includes a partially slotted body portion 671 without flanges. It should be appreciated that many other alternative embodiments are also possible.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A scent carrying hunting boot comprising:
an upper portion configured to cover and support at least a portion of a user's ankle;
a lower portion connected below the upper portion; and
a vented compartment connected to the lower portion, the vented compartment being configured to house and secure a scented material to the lower portion of the boot;
wherein the lower portion further comprises a foot support portion and a sole, the foot support portion located between the upper portion and the sole and including a heel covering portion, wherein the heel covering portion includes a first side, a second side, and a rear portion;
wherein the vented compartment is connected to one of the first or second sides of the heel covering portion, the vented compartment being configured to house and secure a scented material adjacent the heel covering portion;
wherein the vented compartment includes a vented panel, wherein the panel includes a rear portion and an forward portion, wherein the rear portion is positioned closer to a rear end of the boot than the forward portion, and wherein the rear portion is fixedly attached to the heel covering portion;
wherein the boot includes laces and wherein the forward portion of the panel is configured to engage the laces;
wherein the vented compartment includes a panel, the panel including a mesh material that is bordered by a nonmesh material; and
wherein the nonmesh border is a part of a thermoplastic polyurethane auxiliary ankle support member.

2. The boot according to claim 1, wherein the rear portion of the panel is stitched to a side portion of the boot.

3. The boot according to claim 1, wherein the vented compartment is lined with a non-absorbent backing that is connected to the heel covering portion.

4. The boot according to claim 3, wherein the non-absorbent backing is rubber.

5. The boot according to claim 1, wherein the vented scent compartment is configured such that the nonmesh border presses against the non-absorbent material when laces of the boot are tightened.

6. The boot according to claim 1, wherein the mesh border is co-molded to the nonmesh border.

* * * * *